(12) United States Patent
Aron et al.

(10) Patent No.: US 9,052,936 B1
(45) Date of Patent: Jun. 9, 2015

(54) METHOD AND SYSTEM FOR COMMUNICATING TO A STORAGE CONTROLLER IN A VIRTUALIZATION ENVIRONMENT

(71) Applicant: Nutanix, Inc., San Jose, CA (US)

(72) Inventors: Mohit Aron, Los Altos, CA (US); Dheeraj Pandey, San Ramon, CA (US); Ajeet Singh, Cupertino, CA (US)

(73) Assignee: NUTANIX, INC., San Jose, CA (US)

( * ) Notice: Subject to any disclaimer, the term of this patent is extended or adjusted under 35 U.S.C. 154(b) by 153 days.

(21) Appl. No.: 13/744,683

(22) Filed: Jan. 18, 2013

Related U.S. Application Data

(63) Continuation of application No. 13/207,345, filed on Aug. 10, 2011, now Pat. No. 8,601,473.

(51) Int. Cl.
*G06F 9/455* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | | |
|---|---|---|---|
| 6,834,386 B1 | 12/2004 | Douceur et al. | |
| 7,035,881 B2 | 4/2006 | Tummala et al. | |
| 7,360,034 B1 | 4/2008 | Muhlestein et al. | |
| 7,970,851 B2 | 6/2011 | Ponnappan et al. | |
| 8,099,572 B1 | 1/2012 | Arora et al. | |
| 8,194,674 B1 | 6/2012 | Pagel et al. | |
| 8,407,265 B1 | 3/2013 | Scheer et al. | |
| 8,413,146 B1 | 4/2013 | McCorkendale et al. | |
| 8,438,346 B2 | 5/2013 | Gold | |
| 8,539,484 B1 | 9/2013 | Offer | |
| 8,566,821 B2 | 10/2013 | Robinson et al. | |
| 8,683,153 B1 | 3/2014 | Long et al. | |
| 8,910,156 B1 | 12/2014 | Kenchammana-Hosekote et al. | |
| 2002/0002448 A1 | 1/2002 | Kampe | |
| 2002/0091574 A1 | 7/2002 | Lefebvre et al. | |
| 2002/0124137 A1 | 9/2002 | Ulrich et al. | |
| 2002/0161889 A1 | 10/2002 | Gamache et al. | |
| 2002/0184239 A1 | 12/2002 | Mosher et al. | |
| 2003/0046369 A1 | 3/2003 | Sim et al. | |
| 2003/0154236 A1 | 8/2003 | Dar et al. | |
| 2003/0202486 A1 | 10/2003 | Anton, Jr. et al. | |

(Continued)

FOREIGN PATENT DOCUMENTS

WO    WO 2010117294    10/2010

OTHER PUBLICATIONS

Non-final Office Action dated Dec. 26, 2012 for U.S. Appl. No. 13/207,365.

(Continued)

*Primary Examiner* — Charles Swift
(74) *Attorney, Agent, or Firm* — Vista IP Law Group, LLP

(57) ABSTRACT

A system for communicating to a storage controller in a virtualization environment, including a plurality of nodes, wherein the plurality of nodes implements a virtualization environment, and a node comprises a hypervisor and multiple user virtual machines; a plurality of storage devices that are accessed by the virtual machine; and a storage controller implemented as a service virtual machine on the node to manage access by the multiple user virtual machines to the plurality of storage devices, wherein a networking protocol is used to communicate between the multiple user virtual machines and the storage controller.

36 Claims, 20 Drawing Sheets

(56) References Cited

U.S. PATENT DOCUMENTS

| | | |
|---|---|---|
| 2004/0107227 A1 | 6/2004 | Michael |
| 2004/0139128 A1 | 7/2004 | Becker et al. |
| 2004/0221089 A1 | 11/2004 | Sato et al. |
| 2005/0065985 A1 | 3/2005 | Tummala et al. |
| 2005/0102672 A1 | 5/2005 | Brothers |
| 2006/0005189 A1 | 1/2006 | Vega et al. |
| 2006/0112093 A1 | 5/2006 | Lightstone et al. |
| 2006/0123062 A1 | 6/2006 | Bobbitt et al. |
| 2006/0126918 A1 | 6/2006 | Oohashi et al. |
| 2007/0156955 A1 | 7/2007 | Royer, Jr. et al. |
| 2007/0239942 A1 | 10/2007 | Rajwar et al. |
| 2007/0244938 A1 | 10/2007 | Michael et al. |
| 2008/0183973 A1 | 7/2008 | Aguilera et al. |
| 2008/0189700 A1 | 8/2008 | Schmidt et al. |
| 2008/0196043 A1 | 8/2008 | Feinleib et al. |
| 2008/0201709 A1 | 8/2008 | Hodges |
| 2008/0244028 A1 | 10/2008 | Le et al. |
| 2008/0263407 A1 | 10/2008 | Yamamoto |
| 2008/0270564 A1 | 10/2008 | Rangegowda et al. |
| 2008/0282047 A1 | 11/2008 | Arakawa et al. |
| 2009/0172660 A1 | 7/2009 | Klotz, Jr. et al. |
| 2009/0183159 A1 | 7/2009 | Michael et al. |
| 2009/0222542 A1 | 9/2009 | Miyajima |
| 2009/0259759 A1 | 10/2009 | Miyajima |
| 2009/0300660 A1 | 12/2009 | Solomon et al. |
| 2009/0313391 A1 | 12/2009 | Watanabe |
| 2010/0037243 A1 | 2/2010 | Mo et al. |
| 2010/0070470 A1 | 3/2010 | Milencovici et al. |
| 2010/0070725 A1 | 3/2010 | Prahlad et al. |
| 2010/0115174 A1 | 5/2010 | Akyol et al. |
| 2010/0138827 A1 | 6/2010 | Frank et al. |
| 2010/0161908 A1 | 6/2010 | Nation et al. |
| 2010/0162039 A1 | 6/2010 | Goroff et al. |
| 2010/0174820 A1 | 7/2010 | Banga et al. |
| 2010/0251238 A1 | 9/2010 | Schuba et al. |
| 2010/0262586 A1 | 10/2010 | Rosikiewicz et al. |
| 2010/0275198 A1 | 10/2010 | Jess et al. |
| 2010/0281166 A1 | 11/2010 | Buyya et al. |
| 2010/0332889 A1 | 12/2010 | Shneorson et al. |
| 2011/0010515 A1 | 1/2011 | Ranade |
| 2011/0061050 A1 | 3/2011 | Sahita et al. |
| 2011/0071983 A1 | 3/2011 | Murase |
| 2011/0099551 A1 | 4/2011 | Fahrig et al. |
| 2011/0145534 A1 | 6/2011 | Factor et al. |
| 2011/0145916 A1 | 6/2011 | Mckenzie et al. |
| 2011/0154318 A1 | 6/2011 | Oshins et al. |
| 2011/0184993 A1 | 7/2011 | Chawla et al. |
| 2011/0185292 A1 | 7/2011 | Chawala et al. |
| 2011/0202920 A1* | 8/2011 | Takase ............... 718/1 |
| 2011/0208909 A1 | 8/2011 | Kawaguchi |
| 2011/0239213 A1 | 9/2011 | Aswani et al. |
| 2011/0245724 A1 | 10/2011 | Flatland et al. |
| 2011/0258404 A1 | 10/2011 | Arakawa et al. |
| 2011/0314469 A1 | 12/2011 | Qian et al. |
| 2011/0320556 A1 | 12/2011 | Reuther |
| 2012/0002535 A1 | 1/2012 | Droux et al. |
| 2012/0005307 A1 | 1/2012 | Das et al. |
| 2012/0011505 A1 | 1/2012 | Fujisaki et al. |
| 2012/0030676 A1 | 2/2012 | Smith et al. |
| 2012/0036134 A1 | 2/2012 | Malakhov |
| 2012/0054746 A1 | 3/2012 | Vaghani |
| 2012/0079229 A1 | 3/2012 | Jensen et al. |
| 2012/0084445 A1 | 4/2012 | Brock et al. |
| 2012/0096461 A1 | 4/2012 | Goswami et al. |
| 2012/0102006 A1 | 4/2012 | Larson et al. |
| 2012/0102491 A1 | 4/2012 | Maharana |
| 2012/0137098 A1 | 5/2012 | Wang et al. |
| 2012/0144229 A1 | 6/2012 | Nadolski |
| 2012/0158674 A1 | 6/2012 | Lillibridge |
| 2012/0167079 A1 | 6/2012 | Banerjee et al. |
| 2012/0167082 A1 | 6/2012 | Kumar et al. |
| 2012/0167085 A1 | 6/2012 | Subramaniyan et al. |
| 2012/0179874 A1 | 7/2012 | Chang et al. |
| 2012/0221529 A1 | 8/2012 | Rosikiewicz et al. |
| 2012/0254862 A1 | 10/2012 | Dong |
| 2012/0265959 A1 | 10/2012 | Le et al. |
| 2012/0266165 A1 | 10/2012 | Cen et al. |
| 2012/0272240 A1 | 10/2012 | Starks et al. |
| 2012/0284712 A1 | 11/2012 | Nimmagadda et al. |
| 2013/0007219 A1 | 1/2013 | Sorenson et al. |
| 2013/0013865 A1 | 1/2013 | Venkatesh |
| 2013/0014103 A1 | 1/2013 | Reuther et al. |
| 2013/0055259 A1 | 2/2013 | Dong |
| 2013/0061014 A1 | 3/2013 | Prahlad et al. |
| 2014/0006731 A1 | 1/2014 | Uluski et al. |

OTHER PUBLICATIONS

Non-final Office Action dated Jan. 24, 2013 for U.S. Appl. No. 13/207,371.
Thekkath et al., "Frangipani: A Scalable Distributed File System", SOSP, 1997, 24 pages.
Mendel Rosenblum, "The Design and Implementation of a Log-structured File System", SOSP, 1991, 101 pages.
Birrell et al., "A Simple and Efficient Implementation for Small Databases", Aug. 11, 1987, 17 pages.
Terry et al., "Managing Update Conflicts in Bayou, a Weakly Connected Replicated Storage System", Association for Computing Machinery, 1995, 12 pages.
Mike Burrows, "The Chubby lock service for loosely-coupled distributed systems", OSDI 2006 Paper, Google Inc., Sep. 6, 2006, 23 pages.
Lee et al., "Petal: Distributed Virtual Disks" The Proceedings of the 7th International Conference on Architectural Support for Programming Languages and Operating Systems, 1996, 9 pages.
Dean et al., "MapReduce: Simplified Data Processing on Large Clusters", OSDI 2004, 6th Symposium on Operating Systems Design and Implementation, Google Inc, Oct. 3, 2004, 25 pages.
Chang et al., "Bigtable: A Distributed Storage System for Structured Data" OSDI 2006 Paper, 7th USENIX Symposium on Operating Systems Design and Implementation, 2006, 20 pages.
Ghemawat et al., "The Google File System", SOSP 2003, ACM, Bolton Landing, NY, 2003, 15 pages.
Zhu et al., "Avoiding the Disk Bottleneck in the Data Domain Deduplication File System", Data Domain, Inc., 2008, 15 pages.
DeCandia et al., "Dynamo: Amazon's Highly Available Key-value Store", Proceedings of the 21st ACM Symposium on Operating Systems Principles, Oct. 2007, 16 pages.
Project Voldemort, A distributed database, Jan. 9, 2013 url: http://www.project-voldemort.com/voldemort/.
Bernstein et al., "Concurrency Control and Recovery in Database Systems", Addison-Wesley 1987, 35 pages.
Weikum et al., "Transactional Information Systems: Theory, Algorithms, and the Practice of Concurrency Control and Recovery", 2002, 91 pages.
Timothy L. Harris, "A Pragmatic Implementation of Non-Blocking Linked-Lists", 2001, 15 pages.
Lakshman et al., "Cassandra—A Decentralized Structured Storage System", LADIS, 2009, 6 pages.
"Open iSCSI", Project: Open-iSCSI—RFC3720 architecture and implementation, 2005 url: http://www.open-iscsi.org.
"Chunkfs", Aug. 22, 2009 url: http://valerieaurora.org/chunkfs/.
"Hypertable", Hypertable Inc., Oct. 28, 2012 url: http://hypertable.org/.
MacCormick et al., "Boxwood: Abstractions as the Foundation for Storage Infrastructure" OSDI 2004, Microsoft Research Silicon Valley, 31 pages.
Robert Hagmann, "Reimplementing the Cedar File System Using Logging and Group Commit", ACM, 1987, 8 pages.
Sherman et al., "ACMS: The Akamai Configuration Management System" NSDI, 2005, 22 pages.
Petersen et al., "Flexible Update Propagation for Weakly Consistent Replication", SOSP, 1997, 19 pages.
Banga et al., "Resource containers: A new facility for resource management in server systems" Proceedings of the 3rd USENIX Symposium on ODSI, 1999, 15 pages.
F. Mattern, "Virtual Time and Global States of Distributed Systems" Proceedings of the International Workshop on Parallel and Distributed Algorithms, 1989, 15 pages.

(56) References Cited

OTHER PUBLICATIONS

Maged M. Michael, "High Performance Dynamic Lock-Free Hash Tables and List-Based Sets" SPAA 2002, Aug. 2002, 10 pages.
Welsh et al., "SEDA: An Architecuture for Well-Conditioned, Scalable Internet Services" Proceedings of the Eighteenth Symposium on Operating Systems Principles, Oct. 2001, 15 pages.
Notice of Allowance and Fees Due dated Apr. 8, 2013 for U.S. Appl. No. 13/207,365.
Non-final Office Action dated Apr. 11, 2013 for U.S. Appl. No. 13/207,345.
Final Office Action dated Jun. 27, 2013 for U.S. Appl. No. 13/207,371.
Non-final Office Action dated Jan. 27, 2014 for U.S. Appl. No. 13/571,188.
Non-final Office Action dated Apr. 24, 2014, for U.S. Appl. No. 13/744,655.
Notice of Allowance and Fees Due dated May 23, 2014 for U.S. Appl. No. 13/207,357.
Non-Final Office Action dated May 16, 2014 for U.S. Appl. No. 13/744,649.
Notice of Allowance dated Jun. 11, 2014 for U.S. Appl. No. 13/571,188.
Notice of Allowance and Fees Due dated Aug. 23, 2013 for U.S. Appl. No. 13/207,345.
Non-final Office Action dated Aug. 26, 2014 for U.S. Appl. No. 13/744,668.
Corrected Notice of Allowance dated Sep. 5, 2014 for U.S. Appl. No. 13/207,357.
Non-final Office Action dated Sep. 26, 2014 for U.S. Appl. No. 13/947,668.
Non-final Office Action dated Oct. 2, 2014 for U.S. Appl. No. 13/564,511.
Final Office Action dated Nov. 3, 2014, for U.S. Appl. No. 13/744,649.
Final Office Action dated Nov. 3, 2014, for U.S. Appl. No. 13/744,655.
Non-final Office Action dated Nov. 6, 2014, for U.S. Appl. No. 13/744,693.
Notice of Allowance and Fees Due dated Nov. 21, 2014, for U.S. Appl. No. 13/744,703.
Notice of Allowance and fees Due dated Dec. 1, 2014 for U.S. Appl. No. 13/207,371.
Final Office Action dated Jan. 30, 2015 for U.S. Appl. No. 13/564,511.
Final Office Action dated Feb. 12, 2015 for U.S. Appl. No. 13/744,668.
Non-final Office Action dated Feb. 23, 2015 for U.S. Appl. No. 13/744,649.
Non-final Office Action dated Feb. 24, 2015 for U.S. Appl. No. 13/830,116.
Non-final Office Action dated Mar. 5, 2015 for U.S. Appl. No. 13/744,655.
Non-final Office Action dated Mar. 11, 2015 for U.S. Appl. No. 13/551,291.
Non-final Office Action dated Mar. 12, 2015 for U.S. Appl. No. 14/514,326.
Final Office Action dated Apr. 9, 2015 for U.S. Appl. No. 13/744,693.
Notice of Allowance and Fee(s) Due dated Apr. 22, 2015 for U.S. Appl. No. 14/500,730.
Non-final Office Action dated Apr. 27, 2015 for U.S. Appl. No. 14/500,752.
Final Office Action dated May 5, 2015 for U.S. Appl. No. 13/947,668.
Non-final Office Action dated May 6, 2015 for U.S. Appl. No. 13/564,511.

* cited by examiner

METHOD AND SYSTEM FOR COMMUNICATING TO A STORAGE CONTROLLER IN A VIRTUALIZATION ENVIRONMENT

CROSS REFERENCE TO RELATED APPLICATIONS

The present application is a continuation application of U.S. patent application Ser. No. 13/207,345, filed on Aug. 10, 2011, which is hereby incorporated by reference in its entirety.

The present application is related to application Ser. No. 13/207,357, filed on Aug. 10, 2011, entitled "METADATA FOR MANAGING I/O AND STORAGE FOR A VIRTUALIZATION ENVIRONMENT", application Ser. No. 13/207,365, filed on Aug. 10, 2011, entitled "METHOD AND SYSTEM FOR IMPLEMENTING A MAINTENANCE SERVICE FOR MANAGING I/O AND STORAGE FOR A VIRTUALIZATION ENVIRONMENT", application Ser. No. 13/207,371, filed Aug. 10, 2011, entitled "METHOD AND SYSTEM FOR IMPLEMENTING WRITABLE SNAPSHOTS IN A VIRTUALIZED STORAGE ENVIRONMENT", and Application Ser. No. 13/207,375, filed Aug. 10, 2011, entitled "METHOD AND SYSTEM FOR IMPLEMENTING A FAST CONVOLUTION FOR COMPUTING APPLICATIONS", and which are all hereby incorporated by reference in their entirety.

The present application is related to application Ser. No. 13/744,649, entitled "METHOD AND SYSTEM FOR MANAGING DE-DUPLICATION OF DATA IN A VIRTUALIZATION ENVIRONMENT", application Ser. No. 13/744,655, entitled "SYSTEM AND METHOD FOR IMPLEMENTING STORAGE FOR A VIRTUALIZATION ENVIRONMENT", application Ser. No. 13/744,668, entitled "METHOD AND SYSTEM FOR HANDLING OWNERSHIP TRANSFER IN A VIRTUALIZATION ENVIRONMENT", application Ser. No. 13/744,693, entitled "METHOD AND SYSTEM FOR HANDLING STORAGE IN RESPONSE TO MIGRATION OF A VIRTUAL MACHINE IN A VIRTUALIZATION ENVIRONMENT", and Application Ser. No. 13/744,703, entitled "SYSTEM FOR IMPLEMENTING A VIRTUAL DISK IN A VIRTUALIZATION ENVIRONMENT" all filed on even date herewith, and which are all hereby incorporated by reference in their entirety.

FIELD

This disclosure concerns an architecture for managing I/O and storage devices in a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Data Centers are often architected as diskless computers ("application servers") that communicate with a set of networked storage appliances ("storage servers") via a network, such as a Fiber Channel or Ethernet network. A storage server exposes volumes that are mounted by the application servers for their storage needs. If the storage server is a block-based server, it exposes a set of volumes that are also called Logical Unit Numbers (LUNs). If, on the other hand, a storage server is file-based, it exposes a set of volumes that are also called file systems. Either way, a volume is the smallest unit of administration for a storage device, e.g., a storage administrator can set policies to backup, snapshot, RAID-protect, or WAN-replicate a volume, but cannot do the same operations on a region of the LUN, or on a specific file in a file system.

Storage devices comprise one type of physical resources that can be managed and utilized in a virtualization environment. For example, VMWare is a company that provides products to implement virtualization, in which networked storage devices are managed by the VMWare virtualization software to provide the underlying storage infrastructure for the VMs in the computing environment. The VMWare approach implements a file system (VMFS) that exposes storage hardware to the VMs. The VMWare approach uses VMDK "files" to represent virtual disks that can be accessed by the VMs in the system. Effectively, a single volume can be accessed and shared among multiple VMs.

While this known approach does allow multiple VMs to perform I/O activities upon shared networked storage, there are also numerous drawbacks and inefficiencies with this approach. For example, because the VMWare approach is reliant upon the VMFS file system, administration of the storage units occurs at a too-broad level of granularity. While the virtualization administrator needs to manage VMs, the storage administrator is forced to manage coarse-grained volumes that are shared by multiple VMs. Configurations such as backup and snapshot frequencies, RAID properties, replication policies, performance and reliability guarantees etc. continue to be at a volume level, and that is problematic. Moreover, this conventional approach does not allow for certain storage-related optimizations to occur in the primary storage path.

Therefore, there is a need for an improved approach to implement I/O and storage device management in a virtualization environment.

SUMMARY

Embodiments of the present invention provide an architecture for managing I/O operations and storage devices for a virtualization environment. According to some embodiments, a Service VM is employed to control and manage any type of storage device, including direct-attached storage in addition to network-attached and cloud-attached storage. The Service VM implements the Storage Controller logic in the user space, and with the help of other Service VMs in a cluster, virtualizes all storage hardware as one global resource pool that is high in reliability, availability, and performance. IP-based requests are used to send I/O request to the Service VMs. The Service VM can directly implement storage and I/O optimizations within the direct data access path, without the need for add-on products.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Embodiments of the present invention provide an improved approach to implement I/O and storage device management in a virtualization environment. According to some embodiments, a Service VM is employed to control and manage any type of storage device, including direct-attached storage in addition to network-attached and cloud-attached storage. The Service VM implements the Storage Controller logic in the user space, and with the help of other Service VMs in a cluster, virtualizes all storage hardware as one global resource pool that is high in reliability, availability, and performance. IP-based requests are used to send I/O request to the Service VMs. The Service VM can directly implement storage and I/O optimizations within the direct data access path, without the need for add-on products.

Figure 1:
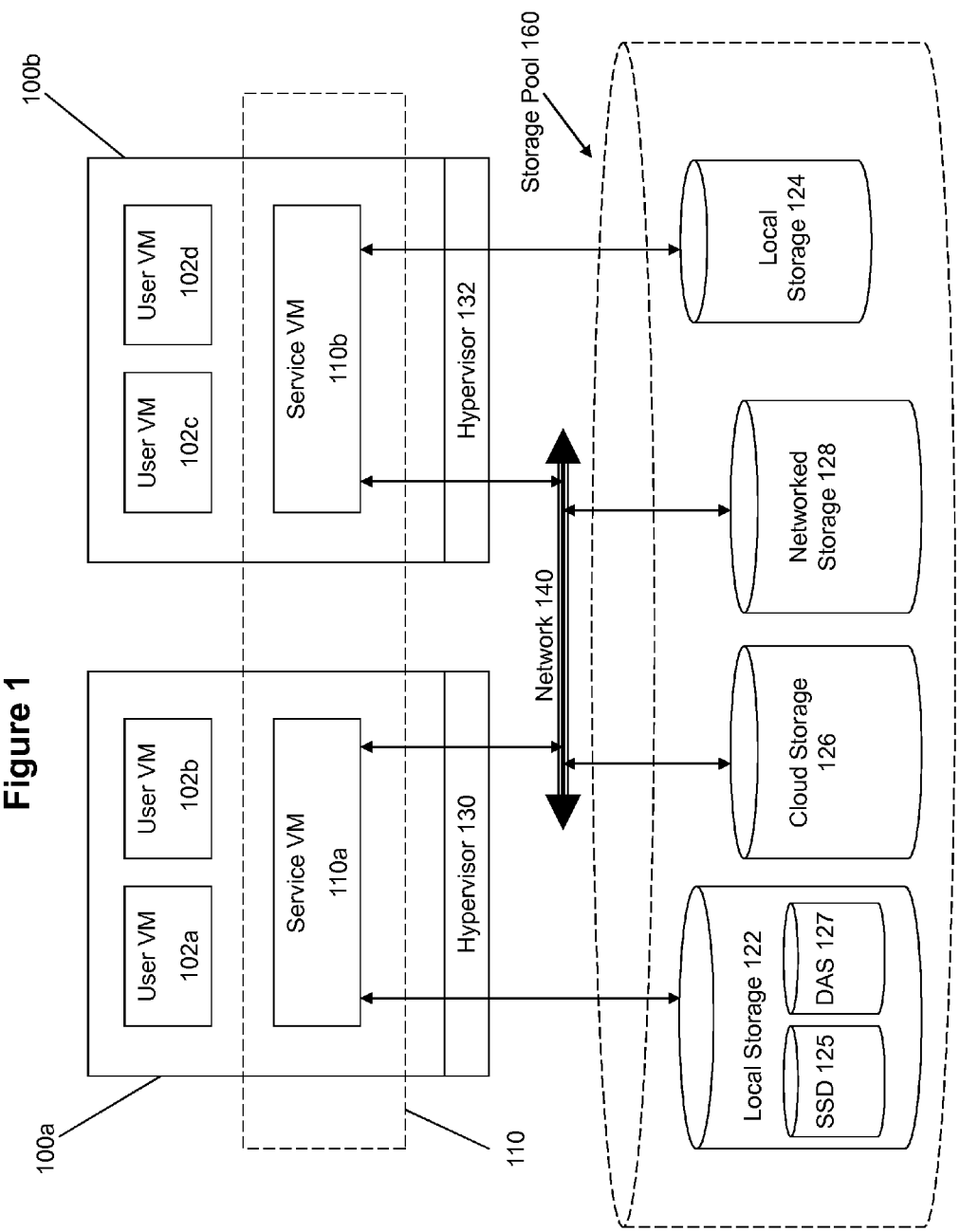
FIG. 1 illustrates an example architecture to implement I/O and storage device management in a virtualization environment according to some embodiments of the invention.

FIG. 1 illustrates an architecture for implementing storage management in a virtualization environment according to some embodiments of the invention. The architecture of FIG. 1 can be implemented for a distributed platform that contains multiple servers 100*a* and 100*b* that manages multiple-tiers of storage. The multiple tiers of storage includes storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100*a* or 100*b* runs virtualization software, such as VMware ESX(i), Microsoft Hyper-V, or RedHat KVM. The virtualization software includes a hypervisor 130/132 to manage the interactions between the underlying hardware and the one or more user VMs 102*a*, 102*b*, 102*c*, and 102*d* that run client software.

A special VM 110*a*/110*b* is used to manage storage and I/O activities according to some embodiment of the invention, which is referred to herein as a "Service VM". This is the "Storage Controller" in the currently described architecture. Multiple such storage controllers coordinate within a cluster to form a single-system. The Service VMs 110*a*/110*b* are not formed as part of specific implementations of hypervisors 130/132. Instead, the Service VMs run as virtual machines above hypervisors 130/132 on the various servers 102*a* and 102*b*, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Service VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QOS) functions, encryption, and compression. The new architecture massively parallelizes storage, by placing a storage controller—in the form of a Service VM—at each hypervisor, and thus makes it possible to render enough CPU and memory resources to achieve the aforementioned optimizations.

Figure 2A:
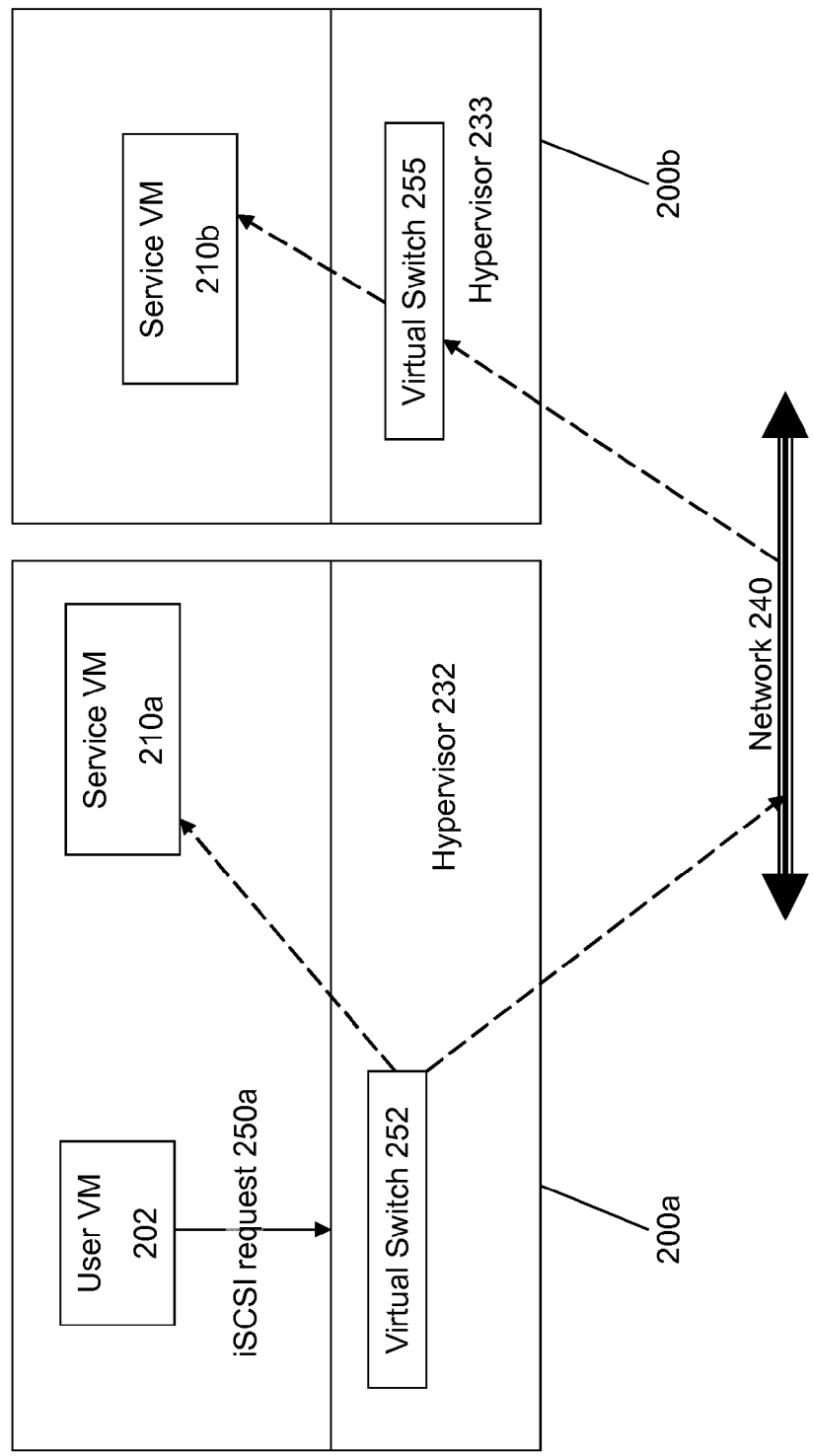
FIGS. 2A-C show alternate approaches to implement I/O requests according to some embodiments of the invention.

FIG. 2A illustrates an example approach that can be taken in some embodiments of the invention to submit I/O requests to the Service VMs 210a/210b from user VMs 202. In this approach, the user VM 202 sends I/O requests 250a to the Service VMs in the form of iSCSI or NFS requests. The term "iSCSI" or "Internet Small Computer System Interface" refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In another embodiment of the invention, the user VM 202 sends I/O requests 250b to the Service VMs in the form of NFS requests. The term "NFS" or "Network File System" interface refers to an IP-based file access standard in which NFS clients send file-based requests to NFS servers via a proxy folder (directory) called "mount point". Going forward, this disclosure will interchangeably use the term iSCSI and NFS to refer to the IP-based protocol used to communicate between the hypervisor and the Service VM. Note that while both protocols are network-based, the currently described architecture makes it possible to use them over the virtual network within the hypervisor. No iSCSI or NFS packets will need to leave the machine, because the communication—the request and the response—begins and ends within the single hypervisor host.

Here, the user VM 202 structures its I/O requests into the iSCSI format. The iSCSI or NFS request 250a designates the IP address for a Service VM from which the user VM 202 desires I/O services. The iSCSI or NFS request 250a is sent from the user VM 202 to a virtual switch 252 within hypervisor 252 to be routed to the correct destination. If the request is to be intended to be handled by the Service VM 210a within the same server 200a, then the iSCSI or NFS request 250a is internally routed within server 200a to the Service VM 210a. As described in more detail below, the Service VM 210a includes structures to properly interpret and process that request 250a.

It is also possible that the iSCSI or NFS request 250a will be handled by a Service VM 210b on another server 200b. In this situation, the iSCSI or NFS request 250a will be sent by the virtual switch 252 to a real physical switch to be sent across network 240 to the other server 200b. The virtual switch 255 within the hypervisor 233 on the server 233 will then route the request 250a to the Service VM 210b for further processing.

Figure 2B:
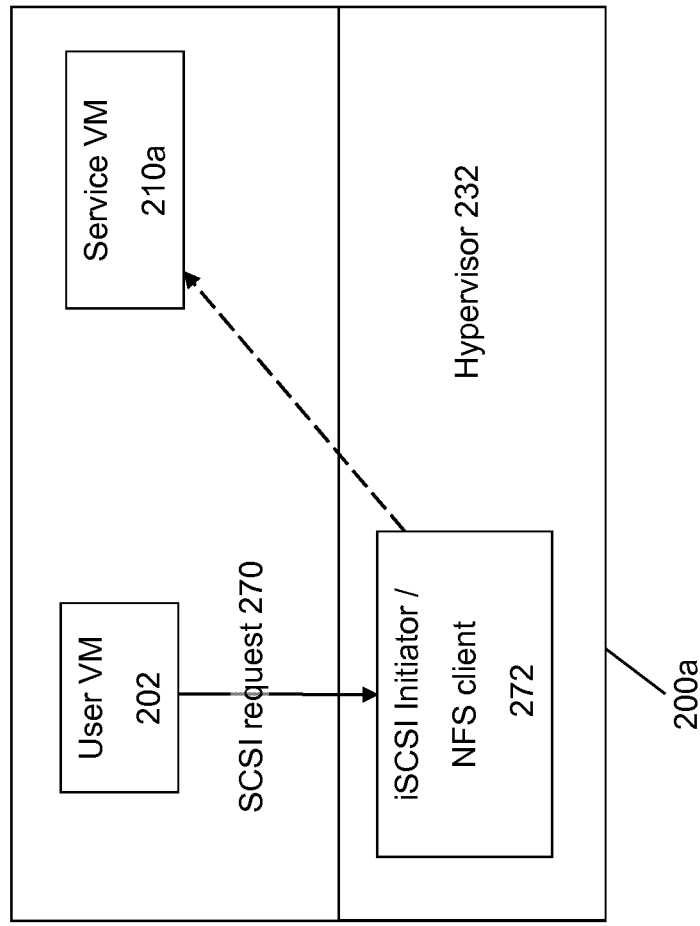

FIG. 2B illustrates an alternate approach in which the I/O requests from the user VM 202 is in the normal SCSI protocol to a storage device. The hypervisor then converts this SCSI request into an iSCSI or an NFS request as part of its hardware emulation layer. In other words, the virtual SCSI disk attached to the user VM is either an iSCSI LUN or an NFS file in an NFS server. In this approach, an iSCSI initiator 272 or the NFS client software is employed to convert the SCSI-formatted requests into the appropriate iSCSI- or NFS-formatted requests that can be handled by the Service VM 210a. The advantage of this approach over the approach of FIG. 2A is that there is no need to individually reconfigure or make sure that the software for the user VMs 202 can work with the iSCSI or NFS protocol.

According to some embodiments, the service VM runs the Linux operating system. As noted above, since the service VM exports a block-device or file-access interface to the user VMs, the interaction between the user VMs and the service VMs follows the iSCSI or NFS protocol, either directly or indirectly via the hypervisor's hardware emulation layer.

Figure 2C:
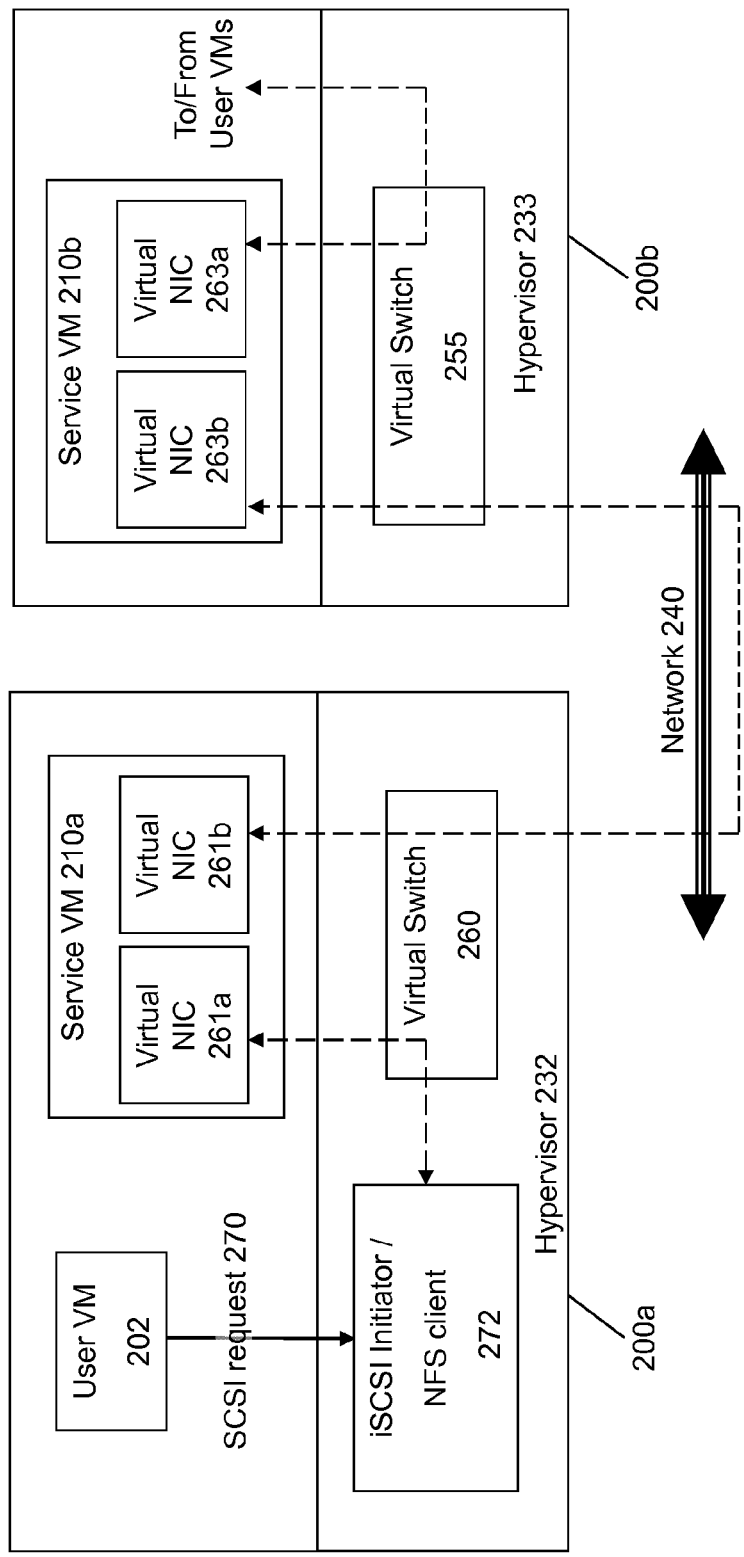

For easy management of the appliance, the Service VMs all have the same IP address isolated by internal VLANs (virtual LANs in the virtual switch of the hypervisor). FIG. 2C illustrates this aspect of the architecture. The Service VM 210a on node 200a implements two virtual network interface cards (NICs) 261a and 261b. One of the virtual NICs 261a corresponds to an internal VLAN that permits the User VM 202 to communicate with the Service VM 210a using the common IP address. The virtual switch 260 would therefore route all communications internal to the node 200a between the User VM 202 and the Service VM 210a using the first virtual NIC 261a, where the common IP address is managed to correspond to the Service VM 210a due to its membership in the appropriate VLAN.

The second virtual NIC 261b is used to communicate with entities external to the node 200a, where the virtual NIC 261b is associated with an IP address that would be specific to Service VM 210a (and no other service VM). The second virtual NIC 261b is therefore used to allow Service VM 210a to communicate with other service VMs, such as Service VM 210b on node 200b. It is noted that Service VM 210b would likewise utilize VLANs and multiple virtual NICs 263a and 263b to implement management of the appliance.

Figure 6:
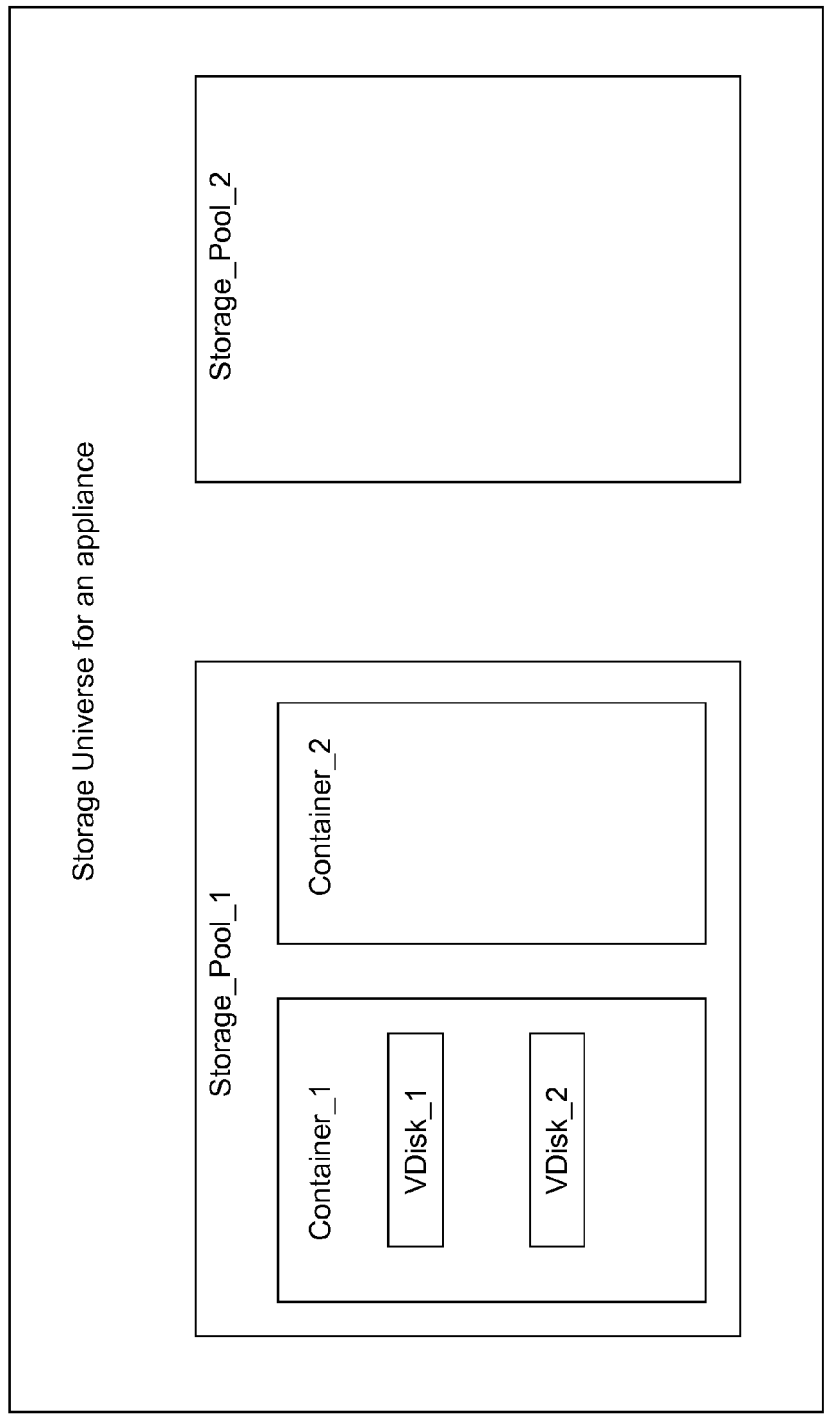
FIG. 6 illustrates a storage hierarchy according to some embodiments of the invention.

For easy management of the appliance, the storage is divided up into abstractions that have a hierarchical relationship to each other. FIG. 6 illustrates the storage hierarchy of the storage objects according to some embodiments of the invention, where all storage in the storage appliance collectively forms a Storage Universe. These storage devices may encompass any suitable devices, such as SSDs, HDDs on the various servers ("server-internal" or local storage), SAN, and Cloud storage.

Storage with similar characteristics is classified into tiers. Thus, all SSDs can be classified into a first tier and all HDDs may be classified into another tier etc. In a heterogeneous system with different kinds of HDDs, one may classify the disks into multiple HDD tiers. This action may similarly be taken for SAN and cloud storage.

The storage universe is divided up into storage pools—essentially a collection of specific storage devices. An administrator may be responsible for deciding how to divide up the storage universe into storage pools. For example, an administrator may decide to just make one storage pool with all the disks in the storage universe in that pool. However, the principal idea behind dividing up the storage universe is to provide mutual exclusion—fault isolation, performance isolation, administrative autonomy—when accessing the disk resources.

This may be one approach that can be taken to implement QoS techniques. For example, one rogue user may result in an excessive number of random IO activity on a hard disk—thus if other users are doing sequential IO, they still might get hurt by the rogue user. Enforcing exclusion (isolation) through storage pools might be used to provide hard guarantees for premium users. Another reason to use a storage pool might be to reserve some disks for later use (field replaceable units, or "FRUs").

As noted above, the Service VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will include its own Service VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Service VM to share in the overall workload of the system to handle storage tasks. Therefore, the current approach is infinitely scalable, and provides a significant advantage over the conventional approaches that have a limited storage processing power. Consequently, the currently described approach creates a massively-parallel storage architecture that scales as and when hypervisor hosts are added to a datacenter.

Figure 3:
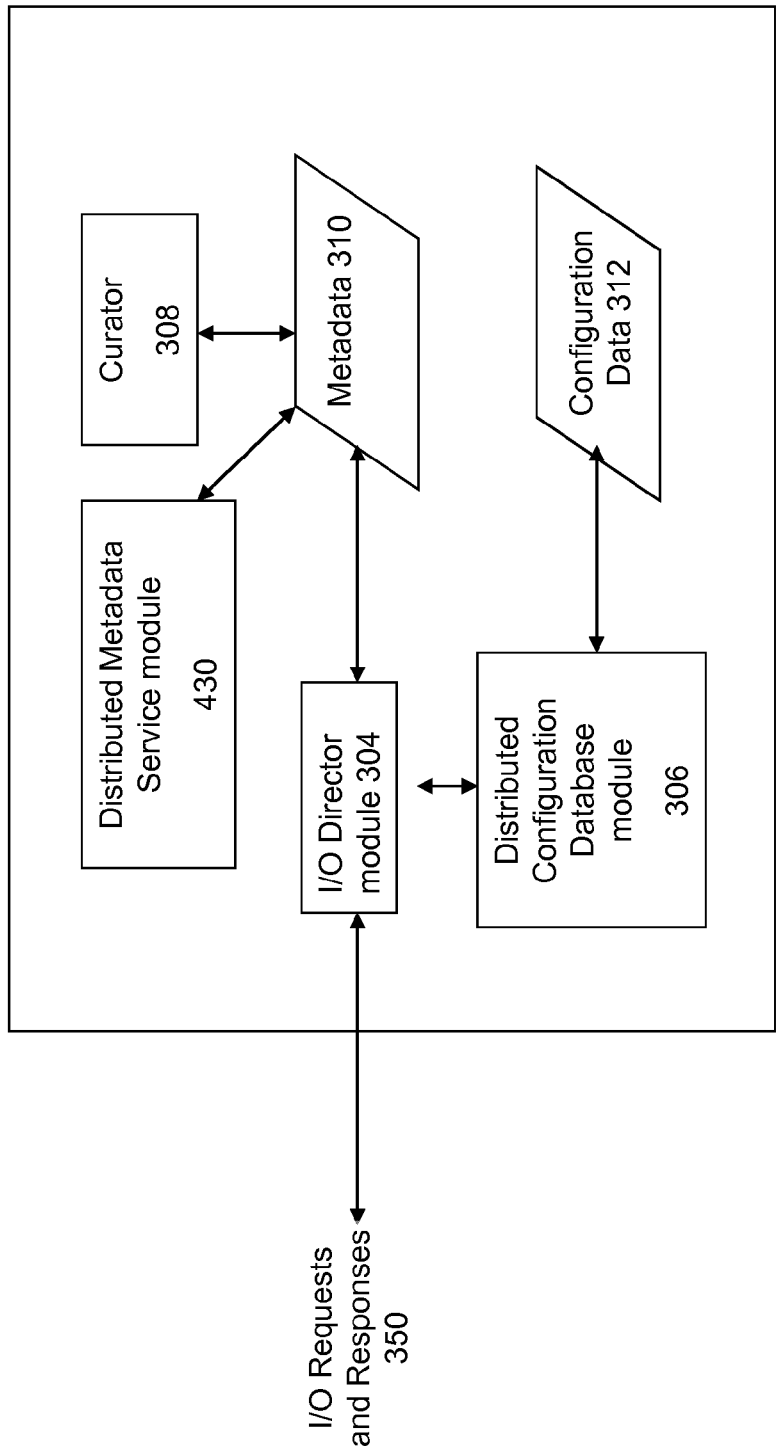
FIG. 3 illustrates the components of a Service VM according to some embodiments of the invention.

FIG. 3 illustrates the internal structures of a Service VM according to some embodiments of the invention. As previously noted, the Service VMs are not formed as part of specific implementations of hypervisors. Instead, the Service VMs run as virtual machines above hypervisors on the various nodes. Since the Service VMs run above the hypervisors, this means that the current approach can be used and implemented within any virtual machine architecture, since the Service VMs of embodiments of the invention can be used in conjunction with any hypervisor from any virtualization vendor. Therefore, the Service VM can be configured to operate ubiquitously anywhere within the computing environment, and will not need to be custom-configured for each different type of operating environment. This is particularly useful because the industry-standard iSCSI or NFS protocols allow the Service VM to be hypervisor-agnostic.

The main entry point into the Service VM is the central controller module 304 (which is referred to here as the "I/O Director module 304"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the service VM's kernel. This write would be intercepted by the I/O Director module 304 running in user space. I/O Director module 304 interprets the iSCSI LUN or the NFS file destination and converts the request into an internal "vDisk" request (e.g., as described in more detail below). Ultimately, the I/O Director module 304 would write the data to the physical storage. I/O Director module 304 is described in more detail below in conjunction with the description of FIG. 4.

Each vDisk managed by a Service VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 310 is maintained by the Service VM to track and handle the vDisks and the data and storage objects in the system that pertain to the vDisks. The Metadata 310 is used to track and maintain the contents of the vDisks and vDisk blocks.

In order to determine where to write and read data from the storage pool, the I/O Director module 304 communicates with a Distributed Metadata Service module 430 that maintains all the metadata 310. In some embodiments, the Distributed Metadata Service module 430 is a highly available, fault-tolerant distributed service that runs on all the Service VMs in the appliance. The metadata managed by Distributed Metadata Service module 430 is itself kept on the persistent storage attached to the appliance. According to some embodiments of the invention, the Distributed Metadata Service module 430 may be implemented on SSD storage.

Since requests to the Distributed Metadata Service module 430 may be random in nature, SSDs can be used on each server node to maintain the metadata for the Distributed Metadata Service module 430. The Distributed Metadata Service module 430 stores the metadata that helps locate the actual content of each vDisk block. If no information is found in Distributed Metadata Service module 430 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing Metadata 310 are described below and in co-pending application Ser. No. 13/207,357, which is hereby incorporated by reference in its entirety.

A health management module 308 (which may hereinafter be referred to as a "Curator") is employed to address and cure any inconsistencies that may occur with the Metadata 310. The Curator 308 oversees the overall state of the virtual storage system, and takes actions as necessary to manage the health and efficient performance of that system. According to some embodiments of the invention, the curator 308 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 308 are disclosed in co-pending application Ser. No. 13/207,365, which is hereby incorporated by reference in its entirety.

Some of the Service VMs also includes a Distributed Configuration Database module 306 to handle certain administrative tasks. The primary tasks performed by the Distributed Configuration Database module 306 are to maintain configuration data 312 for the Service VM and act as a notification service for all events in the distributed system. Examples of configuration data 312 include, for example, (1) the identity and existence of vDisks; (2) the identity of Service VMs in the system; (3) the physical nodes in the system; and (4) the physical storage devices in the system. For example, assume that there is a desire to add a new physical disk to the storage pool. The Distributed Configuration Database module 306 would be informed of the new physical disk, after which the configuration data 312 is updated to reflect this information so that all other entities in the system can then be made aware for the new physical disk. In a similar way, the addition/deletion of vDisks, VMs and nodes would handled by the Distributed Configuration Database module 306 to update the configuration data 312 so that other entities in the system can be made aware of these configuration changes.

Another task that is handled by the Distributed Configuration Database module 306 is to maintain health information for entities in the system, such as the Service VMs. If a Service VM fails or otherwise becomes unavailable, then this module tracks this health information so that any management tasks required of that failed Service VM can be migrated to another Service VM.

The Distributed Configuration Database module 306 also handles elections and consensus management within the system. Another task handled by the Distributed Configuration Database module is to implement ID creation. Unique IDs are generated by the Distributed Configuration Database module as needed for any required objects in the system, e.g., for vDisks, Service VMs, extent groups, etc. In some embodiments, the IDs generated are 64-bit IDs, although any suitable type of IDs can be generated as appropriate for embodiment so the invention. According to some embodiments of the invention, the Distributed Configuration Database module 306 may be implemented on an SSD storage because of the real-time guarantees required to monitor health events.

Figure 4:
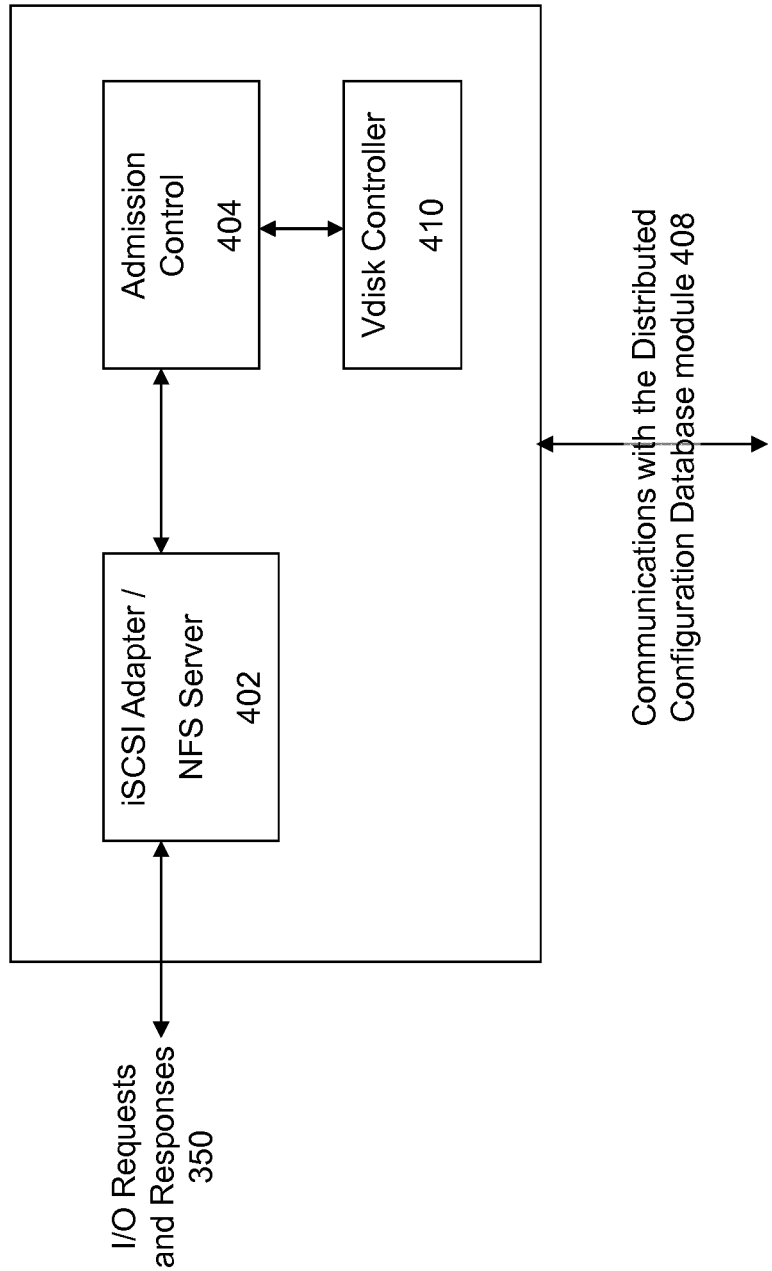
FIG. 4 illustrates the components of an I/O Director module according to some embodiments of the invention.

FIG. 4 illustrates the internal structures of the I/O Director module 304 according to some embodiments of the invention. An iSCSI or NFS adapter 402 is used to convert the incoming iSCSI or NFS request 350 that is in the iSCSI or NFS format (packet-based format) to information that can be used to identify the storage target of the request. In particular, the iSCSI or NFS request 350 is either converted into the LUN ID number or file handle and offset of the storage object to be accessed, as well as the specific action that s being requested.

If the I/O request is intended to write to a vDisk, then the Admission Control module 404 determines whether the Service VM is the owner and/or authorized to write to the particular vDisk identified in the I/O request. In some embodiments, a "shared nothing" architecture is implemented such that only the specific Service VM that is listed as the owner of the vDisk is permitted to write to that vDisk. This ownership information may be maintained by Distributed Configuration Database module 306.

If the Service VM is not the owner. The Distributed Configuration Database module 306 is consulted to determine the owner. The owner is then asked to relinquish ownership so that the current Service VM can then perform the requested I/O operation. If the Service VM is the owner, then the requested operation can be immediately processed.

Admission Control 404 can also be used to implement I/O optimizations as well. For example, Quality of Service (QoS) optimizations can be implemented using the Admission Control 404. For many reasons, it is desirable to have a storage management system that is capable of managing and implementing QoS guarantees. This is because many computing and business organizations must be able to guarantee a certain level of service in order to effectively implement a shared computing structure, e.g., to satisfy the contractual obligations of service level agreements.

Figure 5:
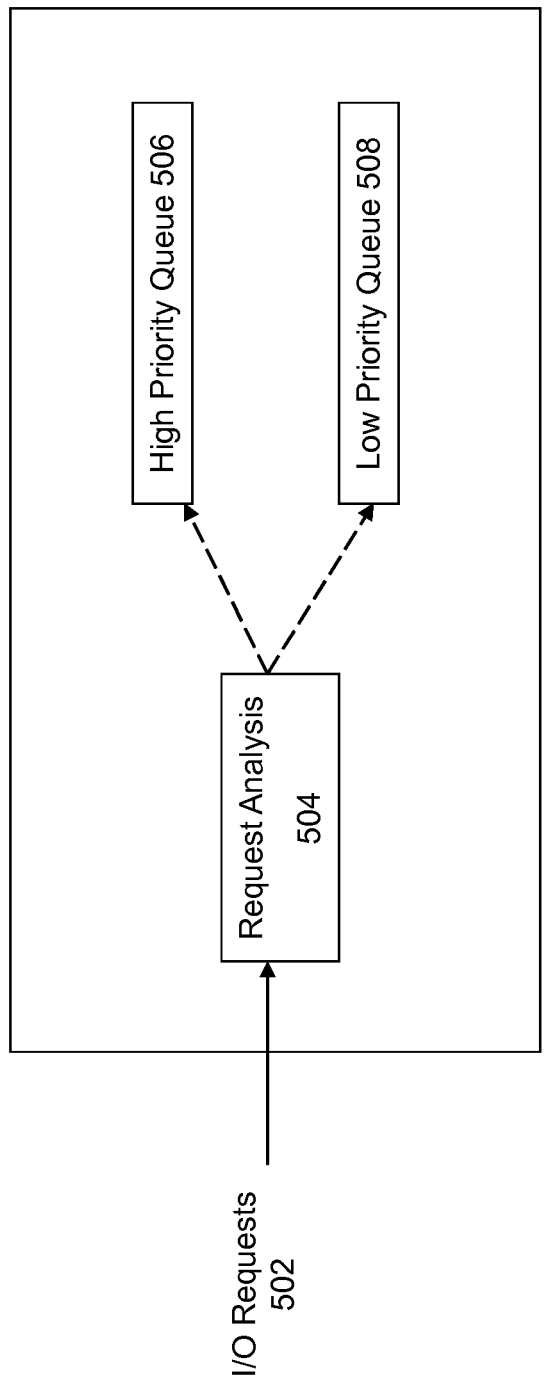
FIG. 5 shows the actions of Admission Control to implement QoS functionality according to some embodiments of the invention.

FIG. 5 illustrates one approach for implementing QoS with Admission Control 404. This approach is premised upon the storage objects, such as the vDisks, being configured to have certain parameters that correspond to desired QoS properties. Multiple requests queues can be established for requests having different priority levels. For example, a high priority queue 506 can be established to queue requests that should be handled with special dispatch. A low priority queue 508 can be established to hold requests that correspond to lower priority requests or requesters.

When the I/O Request 502 is received by a request analyzer 504 in Admission Control 404, the identify and/or type of request/requester is checked to see if the I/O request 502 should be handled in any particular way to satisfy the QoS parameters. If the I/O request 502 is a high priority request, then it is added to the high priority queue 506. If the I/O request 502 is a low priority request, then it is added to the low priority queue 508.

Returning back to FIG. 4, a vDisk Controller 410 is used to perform the actual read and write operations upon the storage objects. This is the software component that determines where the data sits on the vDisks, and accesses those vDisks to implement the desired I/O request. Specialized metadata is used to track the storage objects that are accessed by the vDisk Controller 410.

Embodiments of the invention can be used to directly implement de-duplication when implementing I/O in a virtualization environment. De-duplication refers to the process of making sure that a specific data item is not excessively duplicated multiple times within a storage system. Even if there are multiple users or entities that separately perform operations to store the same data item, the de-duplication process will operate to store only a limited number of copies of the data item, but allow those multiple users/entities to jointly access the copies that are actually stored within the storage system.

In some embodiments, de-duplication is performed directly on primary storage using the virtualized storage management system. The container abstraction can be used to specify a de-duplication domain, where de-duplication is performed for data stored within the container. Data in different containers is not de-duplicated even if it is the same. A container is assigned one storage pool—this defines the disks where the data for that container will be stored. A container supports several configuration parameters that determine how the data on that container is treated, including for example some or all of the following:

1. Replication factor: Data in a container is replicated based on this replication factor. Replicas are placed on different servers whenever possible.
2. Reed Solomon parameters: While all data is written initially based on the specified replication factor, it may be converted later to use Reed Solomon encoding to further save on storage capacity. The data contraction policy on the vDisks enforces when the data is converted to use Reed Solomon encoding.
3. Encryption type: Data in a container is encrypted based on the specified encryption policy if any. It is noted that there are also other encoding schemes which can be utilized as well.
4. Compression type: Data in a container is compressed based on the given compression type. However, when to compress is a policy that's specified on individual vDisks assigned to a container. That is, compression may be done inline, or it may be done offline.
5. Max capacity: This parameter specifies the max total disk capacity to be used in each tier in the assigned storage pools.
6. Min reserved capacity (specified for each tier): This parameter can also be specified for each tier in the assigned storage pools. It reserves a certain amount of disk space on each tier for this container. This ensures that that disk space would be available for use for this container irrespective of the usage by other containers.
7. Min total reserved capacity: This is the minimum reserved across all tiers. This value should be greater than or equal to the sum of the min reserved capacity per tier values.
8. Max de-duplication extent size: The Rabin fingerprinting algorithm breaks up a contiguous space of data into variable sized extents for the purpose of de-duplication. This parameter determines the max size of such extents.
9. Stripe width: To get high disk bandwidth, it is important to stripe data over several disks. The stripe width dictates the number of extents corresponding to a contiguous vDisk address space that'll be put in a single extent group.
10. Tier ordering: All tiers in the assigned storage pools are ordered relative to each other. Hot data is placed in the tier highest up in the order and migrated to other tiers later based on the ILM (Information Lifecycle Management or "data waterfalling") policy. A different tier ordering may be specified for random IO as opposed to sequential IO. Thus, one may want to migrate data to the SSD tier only for random IO and not for sequential IO.
11. ILM policy: The ILM policy dictates when data is migrated from one tier to the tier next in the tier ordering. For example, this migration may start when a given tier is more than 90% full or when the data on that tier is more than X days old.

vDisks are the virtual storage devices that are exported to user VMs by the Service VMs. As previously discussed, the vDisk is a software abstraction that manages an address space of S bytes where S is the size of the block device. Each service VM might export multiple vDisks. A user VM might access several vDisks. Typically, all the vDisks exported by a service VM are accessed only by the user VMs running on that server node. This means that all iSCSI or NFS requests originating from a user VM can stay local to the hypervisor host—going from the user VM to the hypervisor SCSI emulation layer to a virtual switch to the Service VM. A vDisk is assigned a unique container at creation time. The data in the vDisk is thus managed according to the configuration parameters set on the container. Some additional configuration parameters are specified on the vDisk itself, including some or all of the following:

1. De-duplication: This specifies whether de-duplication is to be used for this vDisk. However, when de-duplication is used is determined by the data contraction policy.
2. Data contraction policy: The data contraction policy controls when de-duplication, compression, and Reed-Solomon encoding is applied (if any of them are specified). De-duplication and compression may be applied in-line to a primary storage path or out-of-line. If out-of-line, the data contraction policy specifies the time when deduplication/compression are applied (e.g., X days). Reed-Solomon encoding should be applied offline. The data contraction policy may specify a different time for doing Reed-Solomon than for deduplication/compression. Note that if both deduplication and compression are specified, then data would be de-duplicated and compressed at the same time before writing to disk.
3. Min total reserved capacity: This is the minimum reserved capacity for this vDisk across all the storage tiers. The sum of all minimum total reserved capacity parameters for the vDisks in a container should be less than or equal to the minimum total reserved capacity set on the container.
4. vDisk block size: The vDisk address space is divided into equal sized blocks. It should be less than or equal to the stripe width parameter on the container. A relatively large vDisk block size (e.g., 128 KB) helps reduce the metadata that is maintained.
5. vDisk row blocks: The metadata of a vDisk are conceptually divided into rows. Each row is hash-partitioned onto one metadata server residing in some Service VM in this distributed system. This parameter controls how many blocks of this vDisk are in one TOW.
6. vDisk Capacity: This is the size (in bytes) of the vDisk address space. This effectively controls the size of disk that an external user VM sees.
7. QoS parameters: Each vDisk may specify a priority and a fair share. Competing IO requests from various vDisks shall be scheduled based on this priority and fair share.

In some embodiments of the invention, the basic unit of de-duplication is the extent, which is a contiguous portion of storage on a given storage device. Multiple extents can be collected together and stored within an "extent group."

Figure 7:
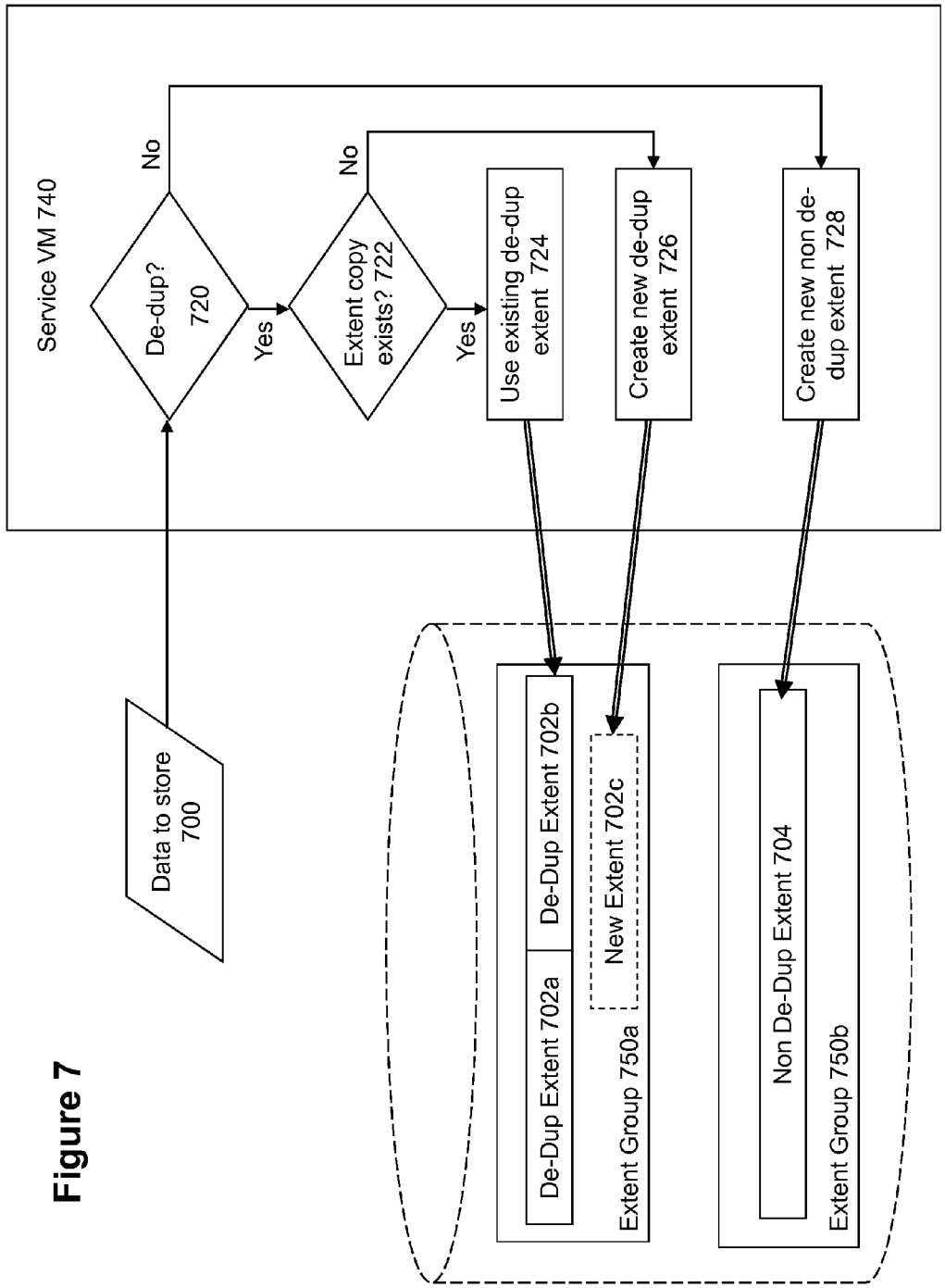
FIG. 7 illustrates an approach for implementing deduplication according to some embodiments of the invention.

The left portion of FIG. 7 illustrates two extent groups 750*a* and 750*b*. Extent group 750*a* includes de-duplication with existing de-duplication extents 702*a* and 702*b*. Extent group 750b includes a non-de-duplication extent 704. As described in more detail below, new extents (such as extent 702c) can be added to an existing extent group, e.g. the extent group 750a, if there is sufficient space in the existing extent group.

Assume that a user issues an I/O request to write an item of data 700 to storage. The service VM 740 will perform a process to analyze the data item 700 and assign that data item 700 to an extent for storage. At 720, a determination is made whether de-duplication is desired or enabled. If not, then at 728, a new non-de-duplication extent 704 is created within an appropriate extent group 750b to store the data item 700.

If de-duplication is enabled, then a further determination is made at 722 whether the storage system already includes a copy of that data item. According to some embodiments, this is accomplished by performing "Rabin fingerprinting" upon the data that is being stored. Rabin fingerprinting is a known algorithm for objectively dividing data into consistent portions. This algorithm creates uniform and common boundaries for data portions that are partitioned out of larger items of data. Further details regarding an exemplary approach that can be taken to identify extents for de-duplication are described in co-pending application Ser. No. 13/207,375, which is hereby incorporated by reference in its entirety. The SHA1 algorithm is applied to the data portion created by Rabin fingerprinting to create a unique signature for that data portion. This is a well-known hashing algorithm that takes any set of arbitrary data and creates a 20 byte content-based signature. The SHA1 algorithm creates a value that is used as an extent identifier (extent ID), which is further used to determine if an earlier copy of the data item 700 has already been stored in the storage system.

If a copy already exists, then a new copy of the data item 700 is not stored; instead, the existing copy stored in de-dup extent 702b is used. A "ref_count" (or reference count) for that extent 702b would be incremented to provide notice that a new entity is now relying upon this extent 702b to store the data item 700. However, if a copy of the data item 200 does not yet exist, then a new extent 702c is created to store the data item 700.

The sizes of the extents and extent groups for the invention can be chosen to suit any desired performance goals. In some embodiments, the extent groups are implemented as 64 Mbyte size files. The non-deduplicated extents are created to have a much larger size than the deduplicated extents. For example, the non-deduplicated extents may be implemented with 1 Mbyte sizes and the deduplicated extents implemented with 8 Kbyte sizes. The goal of this sizing strategy is to make the deduplicated extents as small as practical to facilitate duplications while the non-deduplicated extents are made as large as practical to facilitate efficient physical I/O operations and to prevent the metadata (e.g., the number of rows of metadata) from bloating.

Figure 8:
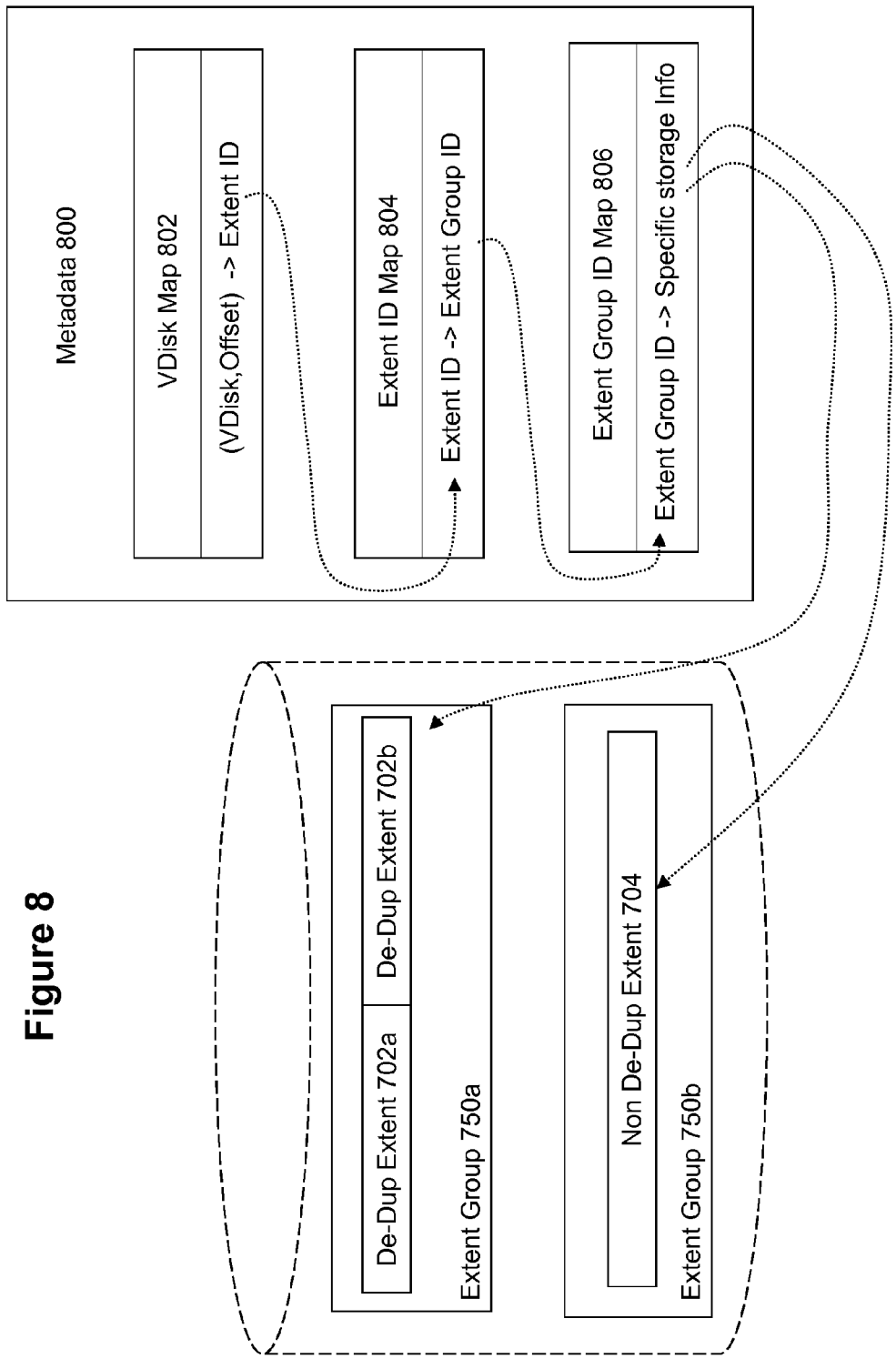
FIG. 8 illustrates metadata for implementing I/O and storage device management in a virtualization environment according to some embodiments of the invention.

As noted above, metadata is maintained by the set of Service VMs to track and handle the data and storage objects in the system. Each vDisk corresponds to a virtual address space forming the individual bytes exposed as a disk to user VMs. As illustrated in FIG. 8, embodiments of the invention maintain three mapping structures as the metadata 800 to track the stored data. A first metadata structure (vDisk map 802) is used to map the vDisk address space for the stored extents. Given a specified vDisk and offset, the vDisk map 802 can be used to identify a corresponding extent ID. A second metadata structure (extent ID map 804) is used to map extent IDs. Given a specified extent ID, the extent ID map 804 can be used to identify a corresponding extent group. A third metadata structure (extent group ID map 806) is used to map specific storage information for extent group IDs. Given a specified extent group ID, the extent group ID map 306 can be used to identify corresponding information, such as for example, (1) disk identifier for the extent group, (2) list of extent IDs in that extent group, (3) information about the extents such as ref_counts, checksums, and offset locations.

The vDisk map expects the I/O request to identify a specific vDisk and an offset within that vDisk. In the present embodiment, the unit of storage is the block, whereas the unit of deduplication is the extent. Therefore, the vDisk map is basically assuming the unit of storage specified by the offset information is to a block, and then identifying the corresponding extent ID from that block, where the extent offset can be derived for within the block.

The discretization into vDisk blocks helps store this information in a table in the vDisk map. Thus, given any random offset within the vDisk, one can discretize it using mod-arithmetic to obtain the corresponding vDisk block boundary. A lookup can be performed in the vDisk map for that (vDisk, vDisk block) combination. The information in each vDisk block is stored as a separate column in the table. A collection of vDisk blocks might be chosen to be stored in a single row—this guarantees atomic updates to that portion of the table. A table can be maintained for the address space of each vDisk. Each row of this table contains the metadata for a number of vDisk blocks. Each column corresponds to one vDisk block. The contents of the column contain a number of extent IDs and the offset at which they start in the vDisk block.

As noted above, a collection of extents is put together into an extent group, which is stored as a file on the physical disks. Within the extent group, the data of each of the extents is placed contiguously along with the data's checksums (e.g., for integrity checks). Each extent group is assigned a unique ID (e.g., 8 byte ID) that is unique to a container. This id is referred to as the extent group ID.

The extent ID map essentially maps an extent to the extent group that it is contained in. The extent ID map forms a separate table within the metadata—one for each container. The name of the table contains the id of the container itself. The lookup key of this table is the canonical representation of an extent ID. In some embodiments, this is either a 16 byte combination containing (vDiskID, Offset) for non-deduplicated extents, or a 24 byte representation containing (extent size, SHA1 hash) for de-duplicated extents. The corresponding row in the table just contains one column—this column contains the extent Group ID where the corresponding extent is contained.

When updates are made to a vDisk address space, the existing extent there is replaced by another (in case of de-duplication and/or for certain types of copy on write operations for snapshots). Thus the old extent may get orphaned (when it is no longer referred to by any other vDisk in that container). Such extents will ultimately be garbage collected. However, one possible approach is to aggressively reclaim disk space that frees up. Thus, a "ref_count" value can be associated with each extent. When this ref_count drops to 0, then it can be certain that there are no other vDisks that refer this extent and therefore this extent can immediately be deleted. The ref_count on a deduplicated extent may be greater than one when multiple vDisks refer to it. In addition, this may also occur when the same extent is referred to by different parts of the address space of the same vDisk. The ref_count on an extent is stored inside the metadata for the extent group in the extent Group ID map rather than in the extent ID map. This enables batch updates to be made to several extents and to allow updates to a single extent Group ID metadata entry. The ref_count on a non-deduplicated extent may be greater than one when multiple snapshots of a vDisk refer to that extent. One possible approach for implementing snapshots in conjunction with the present invention is described in co-pending U.S. Ser. No. 13/207,371, filed on even date herewith, which is incorporated by reference in its entirety.

To reduce the number of lookups by the Distributed Metadata Service module, an optimization can be made for the case of non-deduplicated extents that have a ref_count of one and are owned solely by the vDisk in question. In such a case, the extent ID map does not have an entry for such extents. Instead, the extent Group ID that they belong to is put in the vDisk address space map itself in the same entry where information about the corresponding vDisk block is put. This way, the # of metadata lookups goes down by 1.

The extent Group ID map provides a mapping from a extent Group ID to the location of the replicas of that extent Group ID and also their current state. This map is maintained as a separate table per container, and is looked up with the extent Group ID as the key. The corresponding row in the table contains as many columns as the number of replicas. Each column is referenced by the unique global disk ID corresponding to the disk where that replica is placed. In some embodiments, disk IDs in the server/appliance are assigned once when the disks are prepared. After that, the disk ids are never changed. New or re-formatted disks are always given a new disk ID. The mapping from disk IDs to the servers where they reside is maintained in memory and is periodically refreshed.

An extra column can also be provided for the vDisk ID that created this extent group. This is used to enforce the property that only one vDisk ever writes to an extent group. Thus, there is never a race where multiple vDisks are trying to update the same extent group.

In some embodiments, for each replica, the following information is maintained:
a. The diskID where the replica resides.
b. A Version number.
c. A Latest Intent Sequence number. This is used for maintaining metadata consistency and is explained later in the subsequent sections.
d. The extent ids of each of the extents contained in the extent group. This is either the 8 byte offset for non-deduplicated extents, or 24 bytes (size, SHA1) for deduplicated extents. For each extent, the offset in the extent-GroupID file is also contained here. Additionally a 4 byte reference count is also stored for each extent. Finally, an overall checksum is stored for each extent. This checksum is written after a write finishes and is primarily used to verify the integrity of the extent group data.
e. Information about all the tentative updates outstanding on the replica. Each tentative update carries an Intent Sequence number. It also carries the tentative version that the replica will move to if the update succeeds.

If multiple replicas share the same information, then that information will not be duplicated across the replicas. This cuts down unnecessary metadata bloat in the common case when all the replicas are the same.

At any time, multiple components in the appliance may be accessing and modifying the same metadata. Moreover, multiple related pieces of the metadata might need to be modified together. While these needs can be addressed by using a centralized lock manager and transactions, there are significant performance reasons not to use these lock-based approaches. One reason is because this type of central locking negatively affects performance since all access to metadata would need to go through the centralized lock manager. In addition, the lock manager itself would need to be made fault tolerant, which significantly complicates the design and also hurts performance. Moreover, when a component that holds a lock dies, recovering that lock becomes non-trivial. One may use a timeout, but this results in unnecessary delays and also timing related races.

Therefore, the advanced metadata described above provides an approach that utilizes lock-free synchronization, coupled with careful sequencing of operations to maintain the consistency of the metadata. The main idea is that the order in which the metadata of FIG. 3 is accessed will differ between operations that do not change the metadata (e.g., read operations) and operations that will result in a change to the metadata (e.g., write operations).

With regard to the three metadata maps 802, 804, and 806 shown in FIG. 8, read operations should always proceed in a top-down direction starting with vDisk map 802, then extent ID map 804, followed by extent group ID map 806. In contrast, write operations will proceed in the bottom-up direction starting with the extent group ID map 806, followed by the extent ID map 804, and then subsequently followed by the vDisk map 802.

The reason this works is because any dangling or inconsistent references caused by a failure of the write operations in the bottom-up direction should not result in any detectable inconsistencies for the read operations that work in the top-down direction. This is because each layer of the metadata builds upon each other so that in the top-down direction, an extent ID identified from the vDisk map 802 should have a corresponding entry in the next level extent ID map 804, which in turn is used to identify an extent group ID which itself should have a corresponding entry in the extent group ID map 806.

To explain, consider first the opposite situation in which an update/write operation to the metadata is made in same direction as the read operations (i.e., in the top-down direction). Assume that the write operation successively creates an extent ID entry in the vDisk map 802, but dies before it is able to complete the operation and therefore never has the opportunity to create an entry in the extent ID map 804 that maps the extent ID to an extent group ID. In this situation, a subsequent read operation may possibly read that extent ID from the vDisk map 802, but will encounter a dangling/inconsistent reference because that extent ID does not map to anything in the extent ID map 804.

Now, consider if the update/write operation to the metadata is made in the bottom-up direction. Assume that the write operation successively creates a mapping between the extent ID and an extent group ID in the extent ID map 804. Further assume that the operation dies before it is able to finish, and therefore never has the opportunity to create an entry in the vDisk map 802 for the extent ID. This situation also creates a dangling reference in the extent ID map 804. However, unlike the previous scenario, a subsequent read operation will never reach the dangling reference in the extent ID map 304 because it has to first access the vDisk map 802, and since the previous operation did not reach this map, there is no reference to the new extent ID in the vDisk map 802. Therefore, the subsequent read should not be able to find a path to reach the dangling reference in the extent ID map. In this way, the present approach inherently maintains the integrity of the metadata without needing to provide any central locking schemes for that metadata.

The vDisks can either be unshared (read and written by a single user VM) or shared (accessed by multiple user VMs or hypervisors) according to embodiments of the invention.

Figure 9:
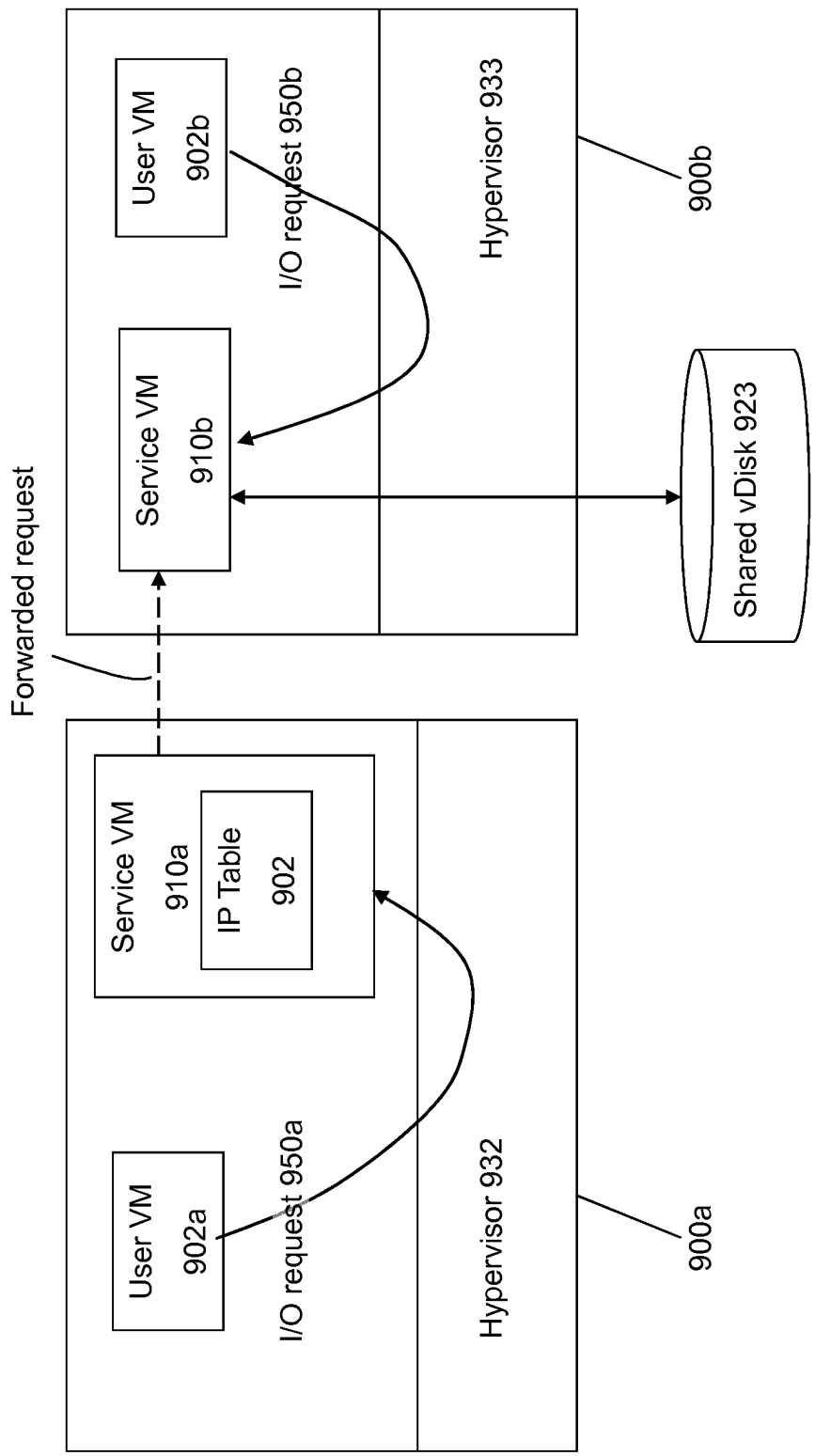
FIG. 9 illustrates shared vDisks according to some embodiments of the invention.

FIG. 9 illustrates the shared vDisk scenario, in which a vDisk 923 can be accessed by multiple user VMs 902a and 902b on different server nodes 900a and 900b, respectively. In the example of FIG. 9, the shared vDisk 923 is owned by Service VM 910b on server node 900b. Therefore, all I/O requests for vDisk 923 will be directed to this Service VM 910b using standard IP forwarding (Network Address Translation) rules in the networking stack of the Service VMs.

For I/O requests 950b from a user VM 902b that resides on the same server node 900b, the process to handle the I/O requests 950b is straightforward, and is conducted as described above. Essentially, the I/O request is in the form of an iSCSI or NFS request that is directed to a given IP address. The IP address for the I/O request is common for all the Service VM on the different server nodes, but VLANs allows the IP address of the iSCSI or NFS request to be private to a particular (local) subnet, and hence the I/O request 950b will be sent to the local Service VM 910b to handle the I/O request 950b. Since local Service VM 910b recognizes that it is the owner of the vDisk 923 which is the subject of the I/O request 950b, the local Service VM 910b will directly handle the I/O request 950b.

Consider the situation if a user VM 902a on a server node 900a issues an I/O request 950a for the shared vDisk 923, where the shared vDisk 923 is owned by a Service VM 910b on a different server node 900b. Here, the I/O request 950a is sent as described above from the user VM 902a to its local Service VM 910a. However, the Service VM 910a will recognize that it is not the owner of the shared vDisk 923. Instead, the Service VM 910a will recognize that Service VM 910b is the owner of the shared vDisk 923. In this situation, the I/O request will be forwarded from Service VM 910a to Service VM 910b so that the owner (Service VM 910b) can handle the forwarded I/O request. To the extent a reply is needed, the reply would be sent to the Service VM 910a to be forwarded to the user VM 902a that had originated the I/O request 950a.

In some embodiments, an IP table 902 (e.g., a network address table or "NAT") is maintained inside the Service VM 910a. The IP table 902 is maintained to include the address of the remote Server VMs. When the local Service VM 910a recognizes that the I/O request needs to be sent to another Service VM 910b, the IP table 902 is used to look up the address of the destination Service VM 910b. This "NATing" action is performed at the network layers of the OS stack at the Service VM 910a, when the local Service VM 910a decides to forward the IP packet to the destination Service VM 910b.

Figure 10:
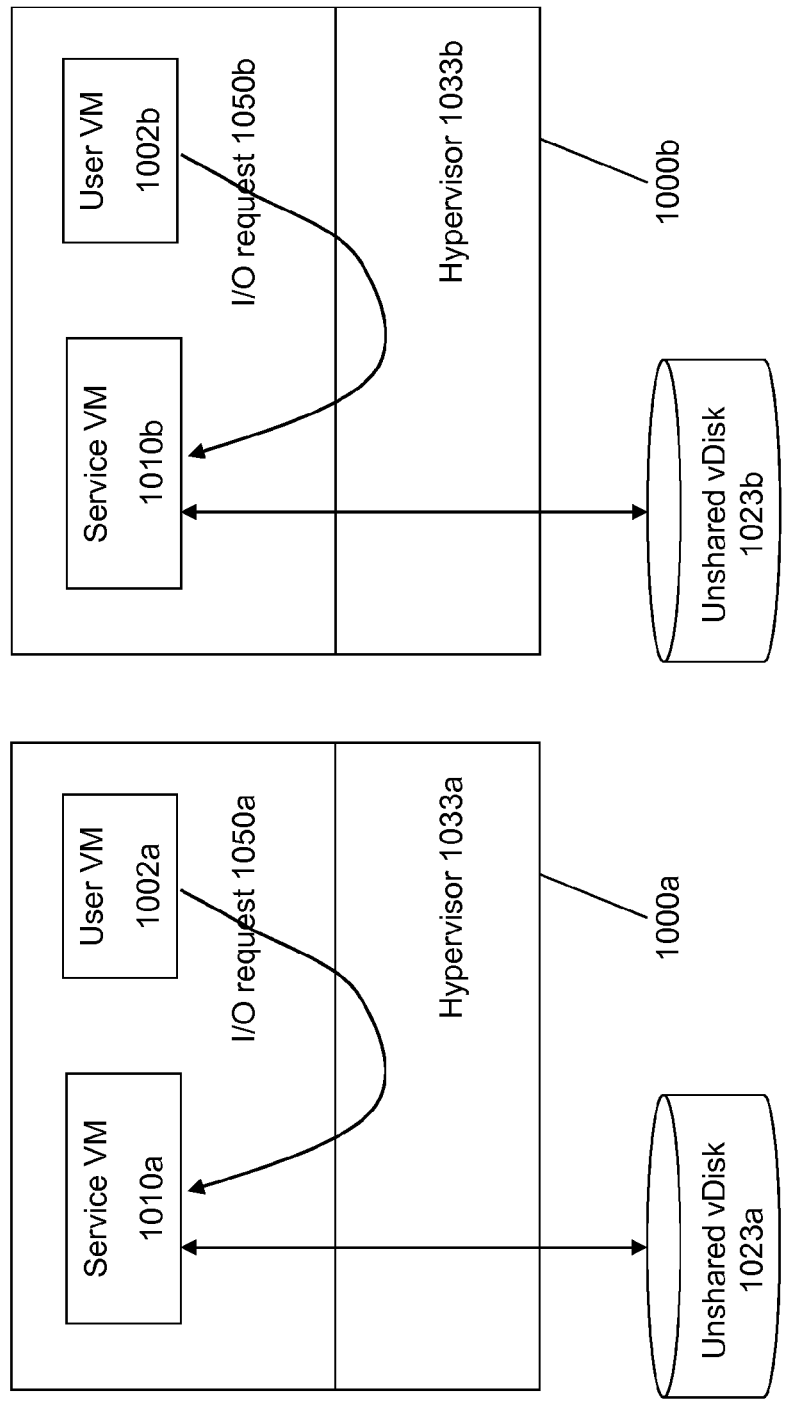
FIG. 10 illustrates shared-nothing vDisks according to some embodiments of the invention.

FIG. 10 shows an example of a "shared nothing" system, in which the vDisks 1023a and 1023b are un-shared vDisks. Therefore, each vDisk in the shared nothing system will be accessed by at most one user VM. Here, vDisk 1023a is un-shared and is accessed only by user VM 1002a on server node 1000a. Similarly, vDisk 1023b is un-shared and is accessed only by user VM 1002b on server node 1000b.

Each un-shared vDisk is owned by the Service VM that is local to the user VM which accesses that vDisk on the shared-nothing basis. In the current example, vDisk 1023a is owned by Service VM 1010a since this Service VM is on the same server node 1000a as the user VM 1002a that accesses this vDisk. Similarly, vDisk 1023b is owned by Service VM 1010b since this Service VM is on the same server node 1000b as the user VM 1002b that accesses this vDisk.

I/O requests 1050a that originate user VM 1002a would therefore be handled by its local Service VM 1023a on the same server node 1000a. Similarly, I/O requests 1050b that originate user VM 1002b would therefore be handled by its local Service VM 1023b on the same server node 1000b. This is implemented using the same approach previously described above, in which the I/O request in the form of an iSCSI or NFS request is directed to a given IP address, and where VLANs allows the IP address of the iSCSI or NFS request to be private to a particular (local) subnet where the I/O request 950b will be sent to the local Service VM to handle the I/O request. Since local Service VM recognizes that it is the owner of the vDisk which is the subject of the I/O request, the local Service VM will directly handle the I/O request.

It is possible that a user VM will move or migrate from one node to another node. Various virtualization vendors have implemented virtualization software that allows for such movement by user VMs. For shared vDisks, this situation does not necessarily affect the configuration of the storage system, since the I/O requests will be routed to the owner Service VM of the shared vDisk regardless of the location of the user VM. However, for unshared vDisks, movement of the user VMs could present a problem since the I/O requests are handled by the local Service VMs.

Figure 11:
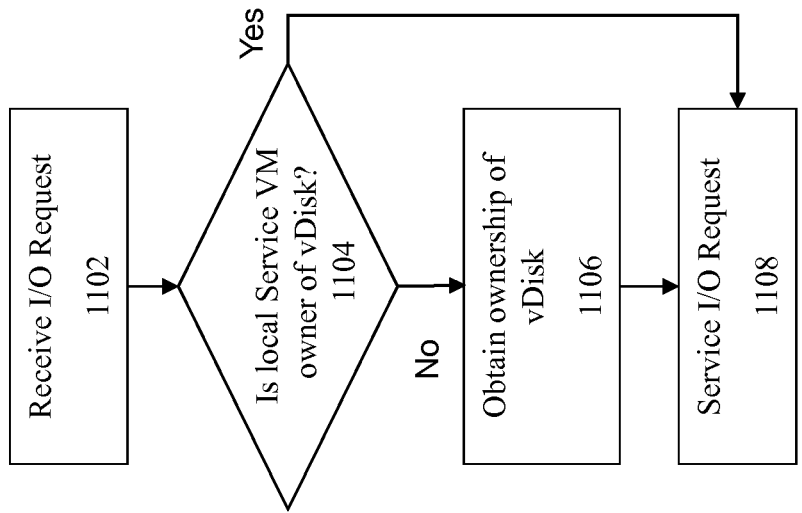
FIG. 11 shows a flowchart of an approach for handling movement of virtual machines for shared nothing vDisks according to some embodiments of the invention.

FIG. 11 illustrates a flowchart of an approach for address this situation for shared nothing implementations according to some embodiments of the invention. The flow begins at 1102 when an I/O request for a given un-shared vDisk is received at a Service VM.

A determination is made at 1104 whether the Service VM is the owner of the un-shared vDisk. If the Service VM is not the owner of the vDisk, this means the user VM which issued the I/O request must have just recently migrated to the node on which the Service VM resides. However, if the Service VM is the owner, this means that the user VM has not recently migrated from another node to the current node, since the Service VM is already registered as the owner of that un-shared vDisk, e.g., due to a previous I/O request that had already been handled by the Service VM.

If the local Service VM is not the owner of the un-shared vDisk, then at 1106, the Service VM will become the owner of that vDisk. This action is performed by contacting the registered owner Service VM of the vDisk (known via The Distributed Configuration Database module), and asking that owner to relinquish ownership of the vDisk. This new ownership information can then be recorded with the central metadata manager.

Once the local Service VM has acquired ownership of the vDisk, then the I/O request can be locally handled by that Service VM at 1108. If the ownership check at 1104 had determined that the Service VM was already the owner, then 1106 would not need to be performed, and the flow would have proceeded directly to 1108.

Figure 12A:
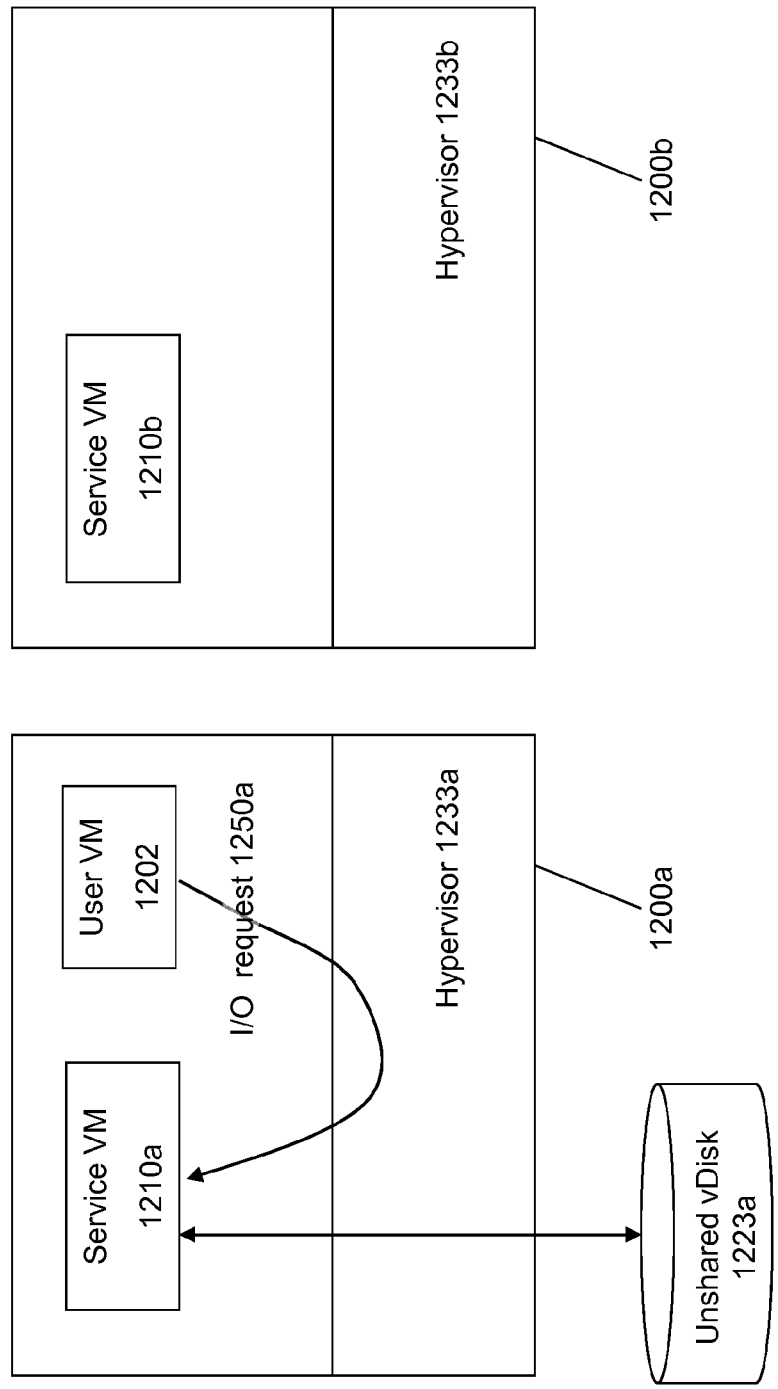
FIGS. 12A-E illustrate the approach of FIG. 11.

FIGS. 12A-E illustrate this sequence of actions. FIG. 12A shows an example of a "shared nothing" system, in which the vDisks 1223a is an un-shared vDisk and is accessed only by user VM 1202 on server node 1200a. Therefore, vDisk 1223a is owned by Service VM 1210a since this Service VM is on the same server node 1200a as the user VM 1202 that accesses this vDisk. I/O requests 1250a that originate from user VM 1202 would therefore be handled by its local Service VM 1223a on the same server node 1200a.

Figure 12B:
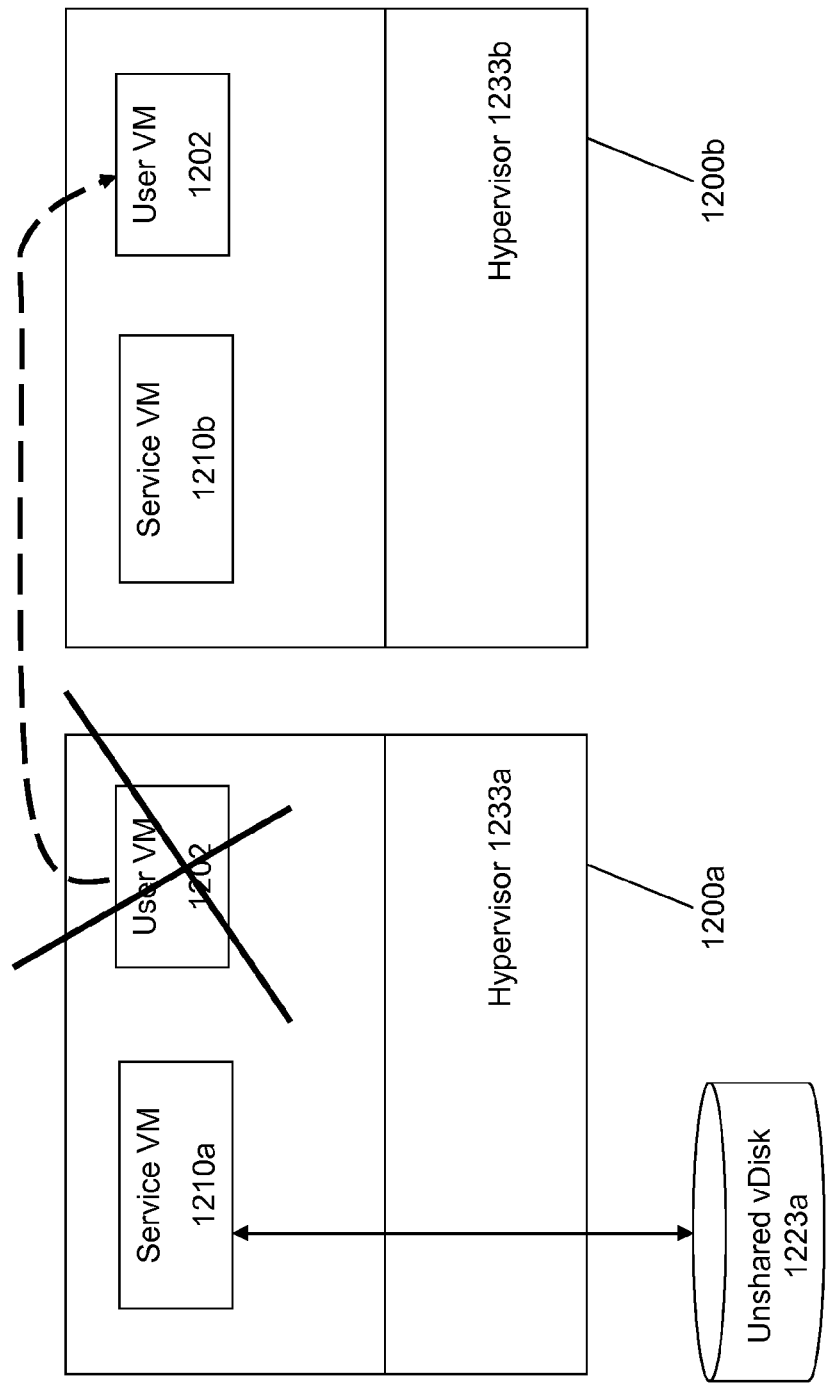

FIG. 12B illustrates the situation when a user VM moves or migrates from one node to another node. Here, the user VM 1202 has migrated from server node 1200a to server node 1200b. The Service VM that is local to server node 1200b is Service VM 1210b. At this point, the user VM 1202 is now resident on a server node 1200b that is associated with a Service VM 1210b that is different from the owner Service VM 1210a for the vDisk 1223a.

Figure 12C:
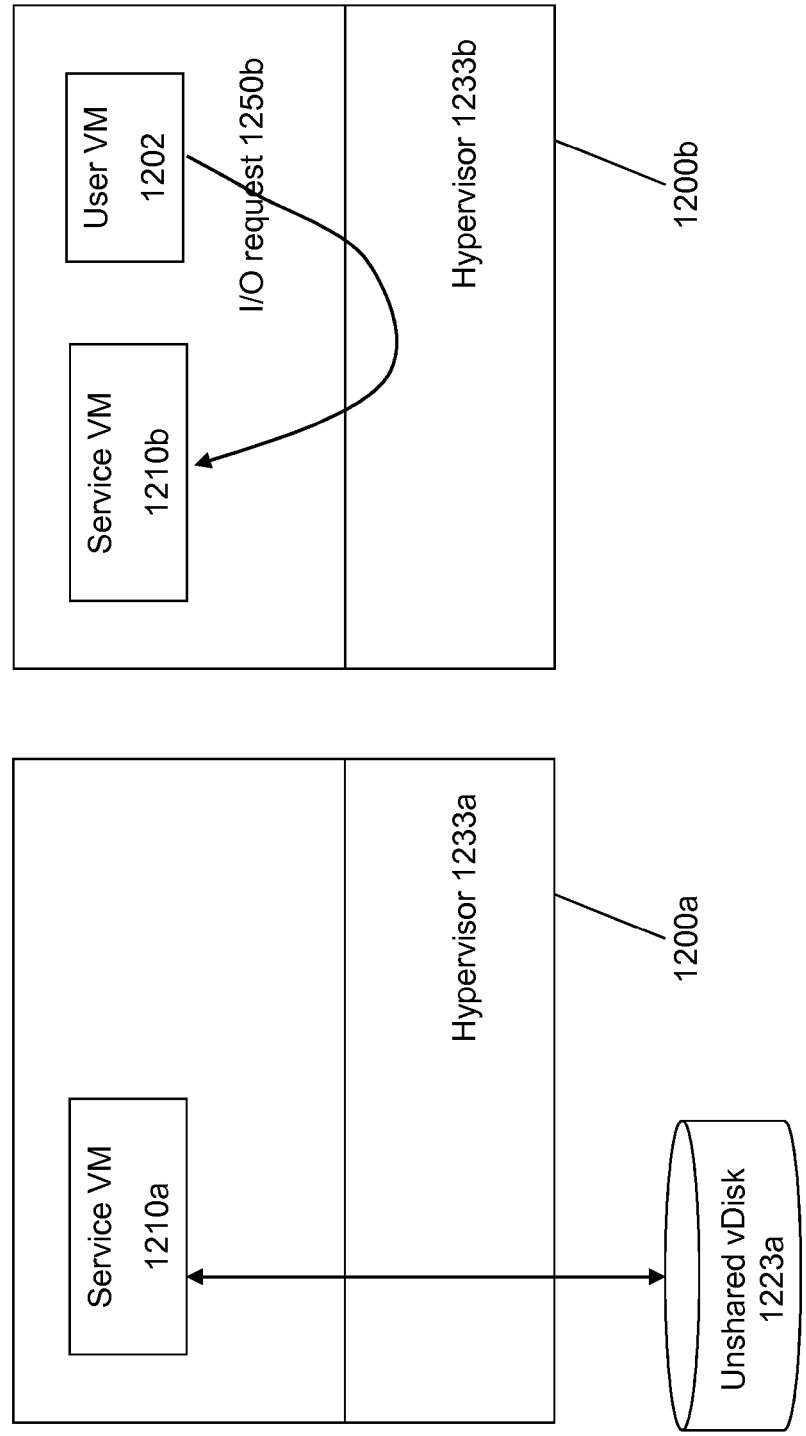

Assume that user VM 1202 now decides to issue an I/O request for vDisk 1223*a*. This situation is illustrated in FIG. 12C. In particular, user VM 1202 has issued an I/O request 1250*b* for vDisk 1223*a*, which has been sent to local Service VM 1210*b*. However, this has now created a potential issue since local Service VM 1210*b* is not the owner of the vDisk 1223*a*.

Figure 12D:
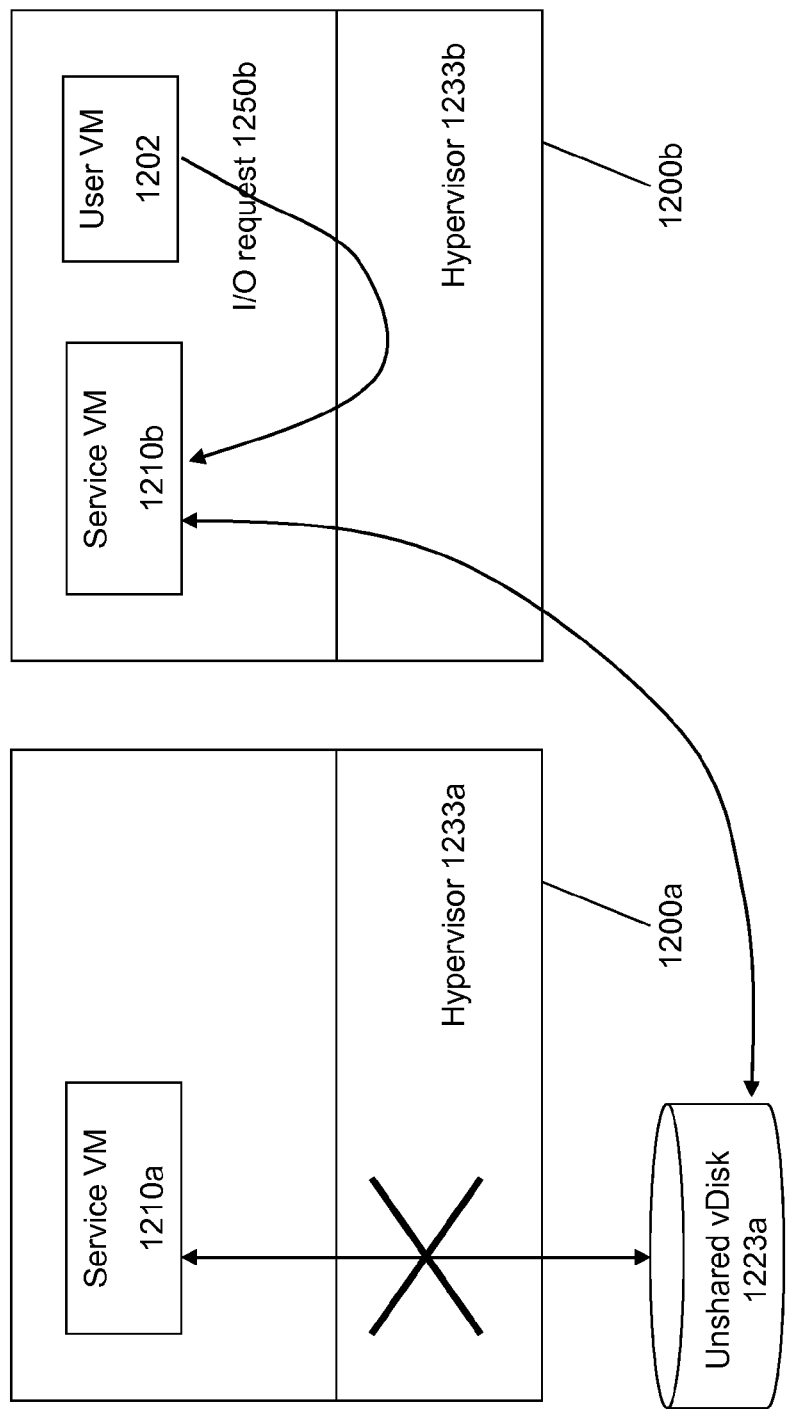
Figure 12E:
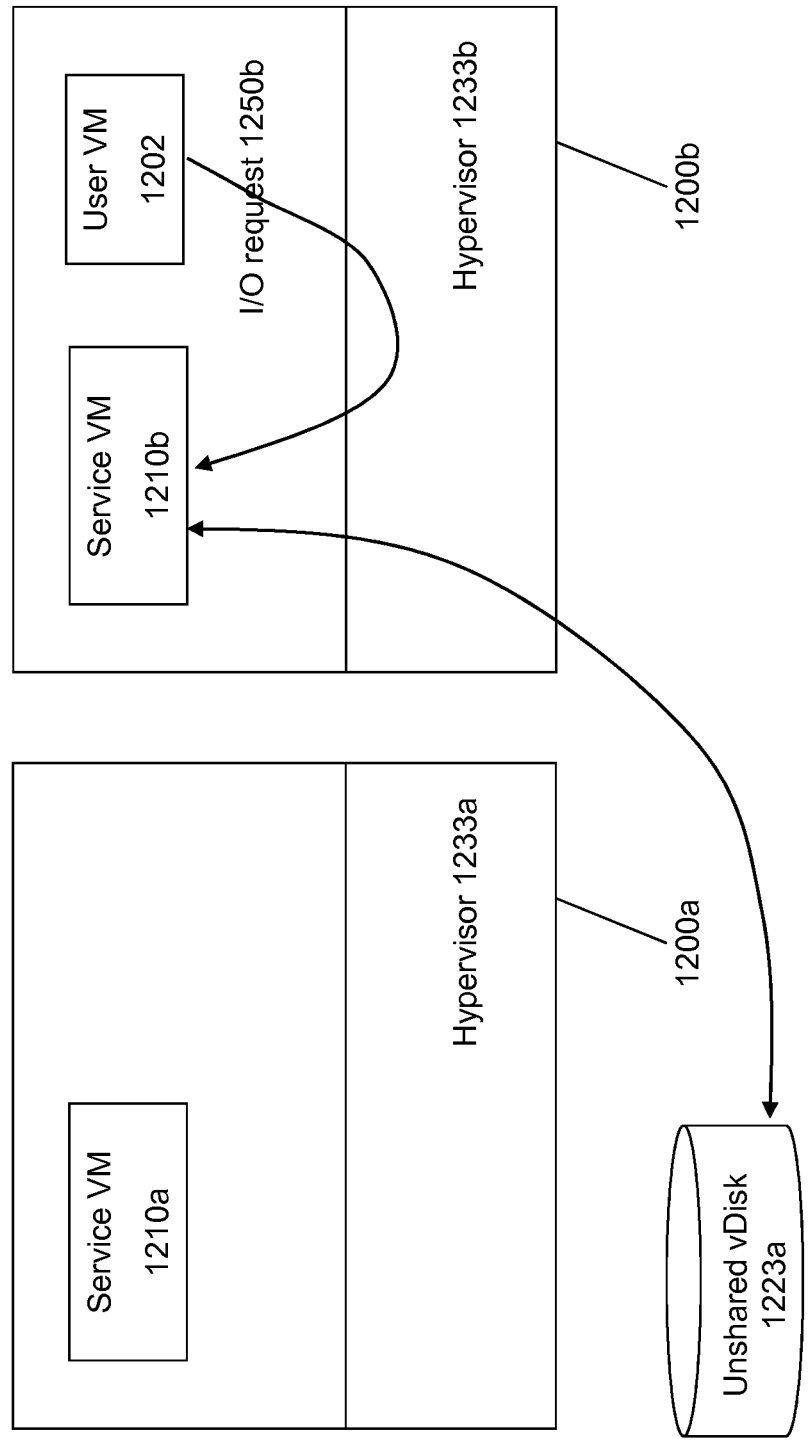

To address this situation, an ownership change will occur for the vDisk 1223*a*. As illustrated in FIG. 12D, the Service VM 1210*a* will relinquish its current ownership of the vDisk 1223*a*. The Service VM 1210*b* will establish itself as the new owner of vDisk 1223*a*. As shown in FIG. 12E, the I/O requests 1250*b* from user VM 1202, when sent to local Service VM 1210*b*, will now be adequately handled since Service VM 1210*b* is the owner of vDisk 1223*a*.

Other possible situations may arise that result in the need to transfer ownership of a vDisk from one Service VM to another Service VM. For example, consider if the Service VM that is the owner of a shared vDisk (or the server node that hosts the Service VM) undergoes a failure. In this situation, a new Service VM will need to take over as the owner of the vDisk to handle ongoing I/O request for that vDisk.

Figure 13:
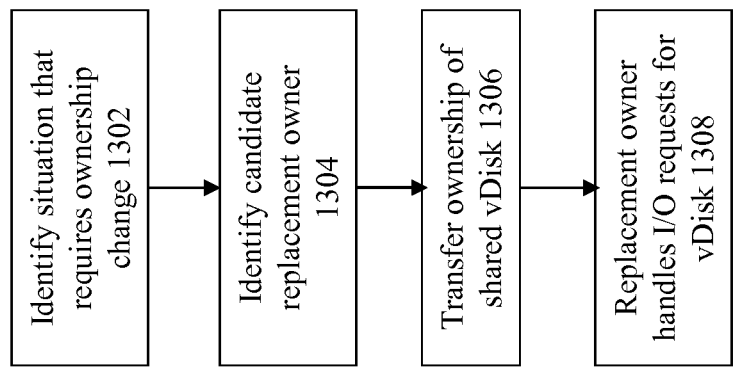
FIG. 13 shows a flowchart of an approach for handling failure of a Service VM for a shared vDisk according to some embodiments of the invention.

FIG. 13 shows a flowchart of an approach for handling ownership transfers according to some embodiments of the invention. At 1302, identification is made of a situation in which an ownership transfer is required. For example, there may be recognition that the Service VM owner of a shared vDisk has failed. This action may be accomplished, for example, by having the Distributed Configuration Database module implement regular heartbeat checks to the different Service VMs, where an inconsistent or problematic heartbeat would be recognized as a failure of the Service VM. If the failed Service VM having the heartbeat problem is registered as the owner of a shared vDisk, then The Distributed Configuration Database module would recognize that a new owner is needed for the shared vDisk.

At 1304, a candidate owner is identified for the vDisk. In some embodiments, this action can be handled using a leadership election process to identify the owner of the vDisk. This election process works by having the different Service VMs "volunteer" to the owner of a vDisk, where one Service VM is actually selected as the owner while the other volunteers are placed on a list as back-up owners. If the actual owner fails, then the next volunteer from the list of backup owners is selected as the new owner. If that selected new owner is not available, then subsequent next candidate(s) are selected from the list until a suitable candidate is identified, e.g., a Service VM that is alive is available to suitably serve as the owner of the vDisk.

At 1306, the candidate owner will obtain ownership of the vDisk. In some embodiments, this action is performed modifying the metadata in the storage system to publish the fact that the candidate Service VM is now the new owner of the vDisk. Thereafter, at 1308, the new owner Service VM will handle subsequent I/O request for that vDisk.

Therefore, what has been described is an improved architecture for implementing I/O and storage device management in a virtualization environment. According to some embodiments, a Service VM is employed to control and manage any type of storage device, including directly attached storage in addition to networked and cloud storage. The Service VM has an entire Storage Controller implemented in the user space, and can be migrated as needed from one node to another. IP-based requests are used to send I/O request to the Service VMs. The Service VM can directly implement storage and I/O optimizations within the direct data access path, without the need for add-on products.

System Architecture

Figure 14:
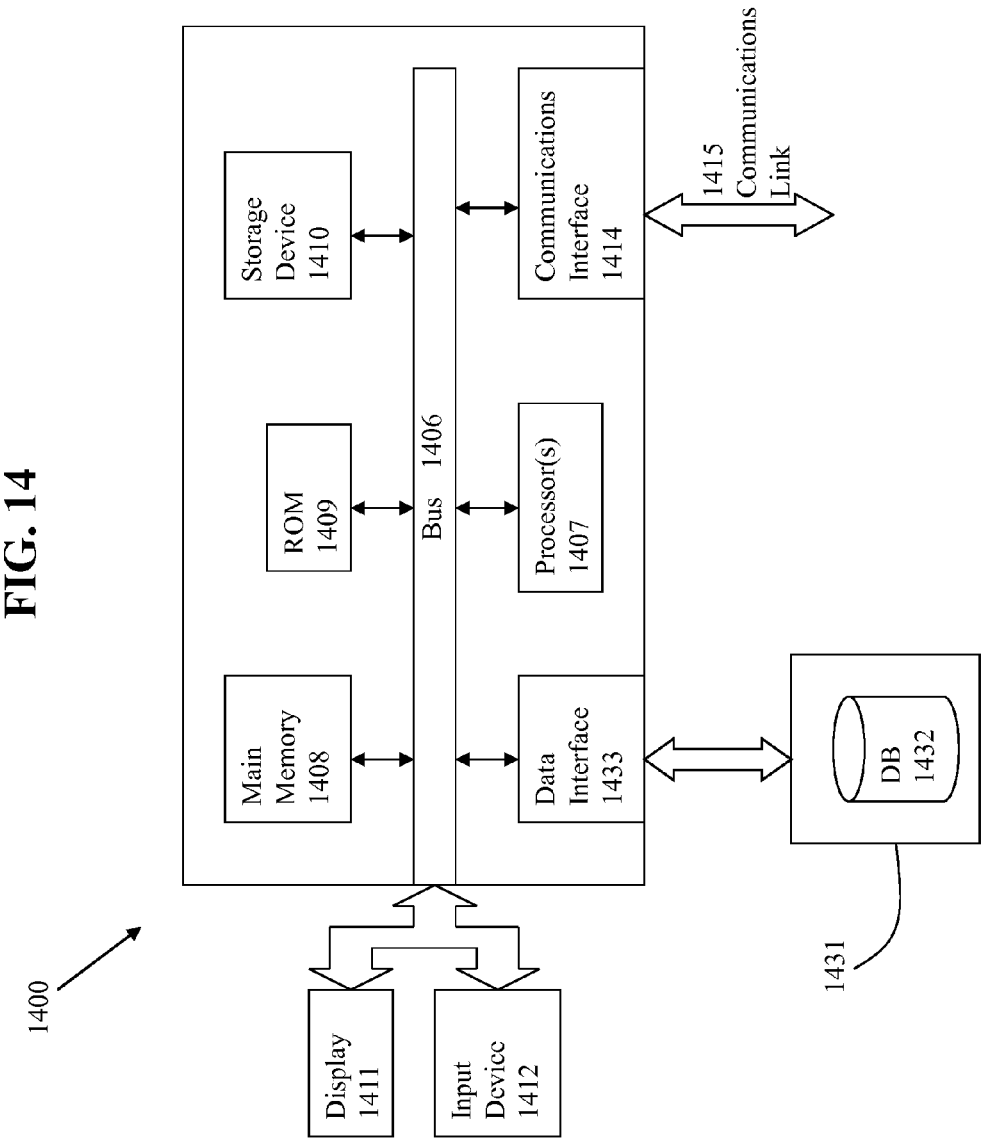
FIG. 14 is a block diagram of a computing system suitable for implementing an embodiment of the present invention.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system for communicating to a storage controller in a virtualization environment, comprising:
a plurality of nodes including at least a first node and a second node, wherein the plurality of nodes implements a virtualization environment, and a node comprises a hypervisor and multiple user virtual machines;
a plurality of storage devices that are accessed by the multiple user virtual machines; and
a storage controller implemented as a service virtual machine on the node to manage access by the multiple user virtual machines to the plurality of storage devices, wherein a networking protocol is used to communicate between the multiple user virtual machines and the storage controller;
wherein a first service virtual machine on the first node and a second service virtual machine on the second node correspond to a same IP address.

2. The system of claim 1 in which the multiple user virtual machines and the service virtual machine communicate using iSCSI.

3. The system of claim 2 in which an iSCSI request is issued by the multiple user virtual machines to access the plurality of storage devices.

4. The system of claim 3 in which the service virtual machine converts the iSCSI request into a request for a virtual disk.

5. The system of claim 1 in which the multiple user virtual machines and the service virtual machine communicate using NFS, and a NFS request is issued by the multiple user virtual machines to access the plurality of storage devices.

6. The system of claim 1 in which communications between the multiple user virtual machines and the service virtual machine is carried over a virtual network.

7. The system of claim 6 in which a virtual switch of the hypervisor is used to facilitate the communications.

8. The system of claim 1 in which a VLAN configures the IP address to be local to a subnet on a given node.

9. The system of claim 1 in which an I/O request is forwarded from a first service virtual machine to a second service virtual machine.

10. The system of claim 9 in which an addressing structure is maintained to forward the I/O request.

11. The system of claim 10 in which the addressing structure comprises a network address table.

12. The system of claim 10 in which address lookup is performed at network layers of an operating systems stack within the service virtual machine.

13. A method for communicating to a storage controller in a virtualization environment, comprising:
identifying a communication to be sent between a user virtual machine and a storage controller in a virtualization environment, wherein the user virtual machine resides on a node within a plurality of nodes including at least a first node and a second node and the plurality of nodes implements the virtualization environment, and the node comprises a hypervisor and multiple user virtual machines; and
implementing the communication with a networking protocol to communicate between the user virtual machine and the storage controller;
wherein a first service virtual machine on the first node and a second service virtual machine on the second node correspond to a same IP address.

14. The method of claim 13 in which the user virtual machine and the service virtual machine communicate using iSCSI.

15. The method of claim 14 in which an iSCSI request is issued by the user virtual machine to access a plurality of storage devices.

16. The method of claim 15 in which the service virtual machine converts the iSCSI request into a request for a virtual disk.

17. The method of claim 13 in which the user virtual machine and the service virtual machine communicate using NFS, and a NFS request is issued by the user virtual machine to access a plurality of storage devices.

18. The method of claim 13 in which communications between the user virtual machine and the service virtual machine is carried over a virtual network.

19. The method of claim 18 in which a virtual switch of the hypervisor is used to facilitate the communications.

20. The method of claim 13 in which a VLAN configures the IP address to be local to a subnet on a given node.

21. The method of claim 13 in which an I/O request is forwarded from a first service virtual machine to a second service virtual machine.

22. The method of claim 21 in which an addressing structure is maintained to forward the I/O request.

23. The method of claim 22 in which the addressing structure comprises a network address table.

24. The method of claim 22 in which address lookup is performed at network layers of an operating systems stack within the service virtual machine.

25. A computer program product embodied on a non-transitory computer readable medium, the computer readable medium having stored thereon a sequence of instructions which, when executed by a processor causes the processor to execute a method for communicating to a storage controller in a virtualization environment, the method comprising:
identifying a communication to be sent between a user virtual machine and a storage controller in a virtualization environment, wherein the user virtual machine resides on a node within a plurality of nodes including at least a first node and a second node and the plurality of nodes implements the virtualization environment, and the node comprises a hypervisor and multiple user virtual machines; and
implementing the communication with a networking protocol to communicate between the user virtual machine and the storage controller;
wherein a first service virtual machine on the first node and a second service virtual machine on the second node correspond to a same IP address.

26. The computer program product of claim 25 in which the user virtual machine and the service virtual machine communicate using iSCSI.

27. The computer program product of claim 26 in which an iSCSI request is issued by the user virtual machine to access a plurality of storage devices.

28. The computer program product of claim 27 in which the service virtual machine converts the iSCSI request into a request for a virtual disk.

29. The computer program product of claim 25 in which the user virtual machine and the service virtual machine communicate using NFS, and a NFS request is issued by the user virtual machine to access plurality of storage devices.

30. The computer program product of claim 25 in which communications between the user virtual machine and the service virtual machine is carried over a virtual network.

31. The computer program product of claim 30 in which a virtual switch of the hypervisor is used to facilitate the communications.

32. The computer program product of claim 25 in which a VLAN configures the IP address to be local to a subnet on a given node.

33. The computer program product of claim 25 in which an I/O request is forwarded from a first service virtual machine to a second service virtual machine.

34. The computer program product of claim 33 in which an addressing structure is maintained to forward the I/O request.

35. The computer program product of claim 34 in which the addressing structure comprises a network address table.

36. The computer program product of claim 34 in which address lookup is performed at network layers of an operating systems stack within the service virtual machine.

\* \* \* \* \*